(12) United States Patent
Sobieranski et al.

(10) Patent No.: US 10,769,765 B2
(45) Date of Patent: Sep. 8, 2020

(54) IMAGING SYSTEMS AND METHODS OF USING THE SAME

(71) Applicant: The Brigham and Women's Hospital Inc., Boston, MA (US)

(72) Inventors: Antonio C. Sobieranski, Florianopolis (BR); Utkan Demirci, Stanford, CA (US); Huseyin C. Tekin, Bursa (TR); Fatih Inci, Palo Alto, CA (US)

(73) Assignee: The Brigham and Women's Hospital, Inc., Boston, MA (US)

( * ) Notice: Subject to any disclaimer, the term of this patent is extended or adjusted under 35 U.S.C. 154(b) by 0 days.

(21) Appl. No.: 16/409,979

(22) Filed: May 13, 2019

(65) Prior Publication Data

US 2019/0340736 A1    Nov. 7, 2019

Related U.S. Application Data

(63) Continuation of application No. 15/553,630, filed as application No. PCT/US2016/019548 on Feb. 25, 2016, now Pat. No. 10,430,933.
(Continued)

(51) Int. Cl.
*G06T 5/50*    (2006.01)
*G03H 1/04*    (2006.01)
(Continued)

(52) U.S. Cl.
CPC ............ *G06T 5/50* (2013.01); *G03H 1/0443* (2013.01); *G03H 1/0866* (2013.01);
(Continued)

(58) Field of Classification Search
CPC ............ G06T 5/50; G06T 2207/20056; G06T 2207/20221; G03H 1/0866; G03H 1/265;
(Continued)

(56) References Cited

U.S. PATENT DOCUMENTS 6,206,524 B1    3/2001    Jacob
2003/0202630 A1    10/2003    Chen
(Continued)

FOREIGN PATENT DOCUMENTS

EP    1800289    6/2007
WO    2014024076    2/2014

OTHER PUBLICATIONS

Bishara, et al., Lensfree On-Chip Microscopy Over a Wide Field-of-View Using Pixel Super-Resolution, Optics Express, 2010, 18(11)11181-11191.
(Continued)

*Primary Examiner* — Jared Walker
(74) *Attorney, Agent, or Firm* — Quarles & Brady LLP; Yakov Sidorin

(57) ABSTRACT

Method and system for lensless, shadow optical imaging. Formation of a hologram shadow image having higher spatial resolution and lower noise level is accomplished by processing image information contained in multiple individual hologram shadow image frames acquired either under conditions of relative shift between point light source and the detector of the system or under stationary conditions, when system remains fixed in space and is devoid of any relative movement during the process of acquisition of individual image frames.

10 Claims, 20 Drawing Sheets

Related U.S. Application Data

(60) Provisional application No. 62/121,603, filed on Feb. 27, 2015.

(51) Int. Cl.
  | | |
  |---|---|
  | *G03H 1/08* | (2006.01) |
  | *H04N 5/232* | (2006.01) |
  | *G03H 1/26* | (2006.01) |

(52) U.S. Cl.
  CPC ......... *G03H 1/265* (2013.01); *H04N 5/23232* (2013.01); *G03H 2001/0447* (2013.01); *G03H 2001/0825* (2013.01); *G03H 2001/2655* (2013.01); *G03H 2222/15* (2013.01); *G03H 2226/11* (2013.01); *G03H 2227/03* (2013.01); *G03H 2240/56* (2013.01); *G06T 2207/20056* (2013.01); *G06T 2207/20221* (2013.01)

(58) Field of Classification Search
  CPC ......... G03H 1/0443; G03H 2001/0825; G03H 2001/2655; G03H 2227/03; G03H 2240/56; G03H 2222/15; G03H 2226/11; G03H 2001/0447; H04N 5/23232
  See application file for complete search history.

(56) References Cited

U.S. PATENT DOCUMENTS

| | | | |
|---|---|---|---|
| 2006/0007395 A1* | 1/2006 | Mayo | A61B 3/103 351/205 |
| 2006/0203196 A1* | 9/2006 | Van Heugten | A61B 3/103 351/221 |
| 2010/0128109 A1 | 5/2010 | Banks | |
| 2011/0211059 A1 | 9/2011 | Smith | |
| 2011/0298896 A1 | 12/2011 | Dillon | |
| 2012/0098950 A1 | 4/2012 | Zheng | |
| 2013/0108015 A1 | 5/2013 | Kottler | |
| 2013/0258091 A1 | 10/2013 | Ozcan | |
| 2013/0280752 A1 | 10/2013 | Ozcan | |
| 2014/0126691 A1 | 5/2014 | Zheng | |
| 2014/0198606 A1 | 7/2014 | Morscher | |
| 2014/0300696 A1 | 10/2014 | Ozcan | |
| 2014/0327943 A1 | 11/2014 | Rosen | |

OTHER PUBLICATIONS

European Patent Office, Extended European Search Report for application 16756352.7, dated Sep. 17, 2018. 7 pages.

Goshtasby, Image Registration: Principles, Tools and Methods (Advances in Computer Vision and Pattern Recognition), Springer, 2012 [Summary Only].

Hardie, et al., High-Resolution Image Reconstruction from a Sequence of Rotated and Translated Frames and Its Application to an Infrared Imaging System, Opt. Eng., 1998, 37(1):247-260.

Mudanyali, et al., Compact, Light-Weight and Cost-Effective Microscope Based on Lensless Incoherent Holography for Telemedicine Applications, Lab on a Chip, 2010, 10(11):1417-1428.

Nayar, et al., Shape From Focus, IEEE Transactions on Pattern Analysis and Machine Intelligence, 1994, 16 (8):824-831.

Ozcan, et al., Ultra Wide-Field Lens-Free Monitoring of Cells On-Chip, Lab on a Chip, 2008, 8:98-106.

PCT International Search Report and Written Opinion, PCT/US2016/019548, dated May 3, 2016, 16 pages.

Pertuz, et al., Analysis of Focus Measure Operators for Shape-From-Focus, Pattern Recognition, 2013, 46 (5):1415-1432.

Quan, et al., Numerical Reconstruction in In-Line Digital Holography by Translation of CCD Position and Gradient Operator Method, Optics Communications, 2011, 284(12):2767-2770.

Seo, et al., Lensfree Holographic Imaging for On-Chip Cytometry and Diagnostics, Lab on a Chip, 2009, 9:777-787.

Shimobaba, et al., Computational Wave Optics Library for C++: CWO++ Library, Computer Physics Communications, 2012, 183(5):1124-1138.

Sobieranski, A. C., et al. "An anisotropic diffusion filtering implementation to execute in parallel distributed systems." 2008 11th IEEE International Conference on Computational Science and Engineering-Workshops. IEEE, 2008.

Sobieranski, A. C., et al. "Portable digital in-line holography platform for sperm cell visualization and quantification." 2014 27th SIBGRAPI Conference on Graphics, Patterns and Images. IEEE, 2014.

Socha, et al., Ant Colony Optimization for Continuous Domains, European Journal of Operational Research, 2008, 185:1155-1173.

Yan, et al., High-Speed CMOS Image Sensor for High-Throughput Lensless Microfluidic Imaging System, In Sensors, Cameras, and Systems for Industrial and Scientific Applications XIII, vol. 8298, p. 829804, International Society for Optics and Photonics, 2012.

Zheng, et al., The ePetri Dish, an On-Chip Cell Imaging Platform Based on Subpixel Perspective Sweeping Microscopy (SPSM), PNAS, 2011, 108(41):16889-16894.

\* cited by examiner

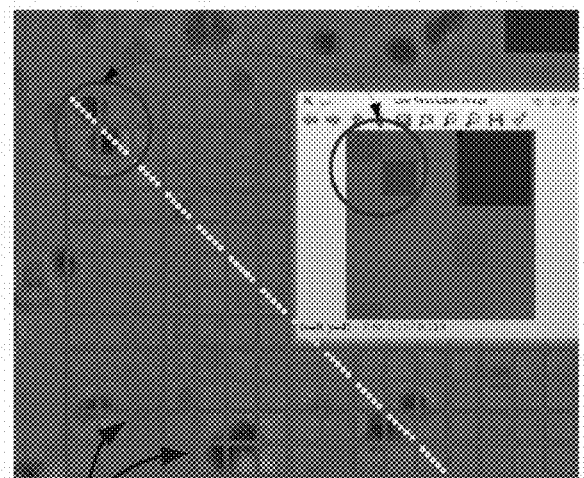
310  FIG. 3A
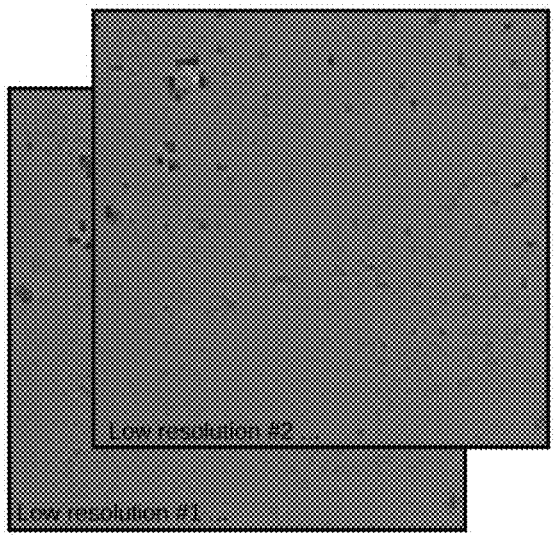
FIG. 3B
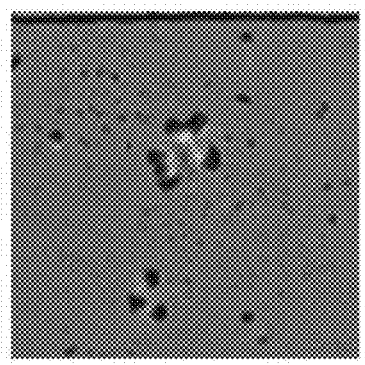
FIG. 4A
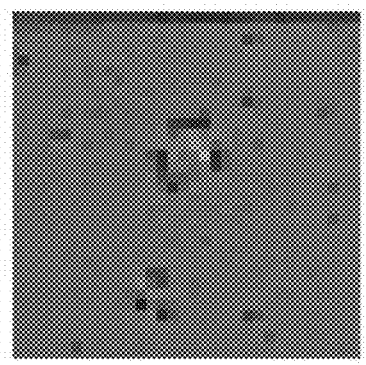
FIG. 4B
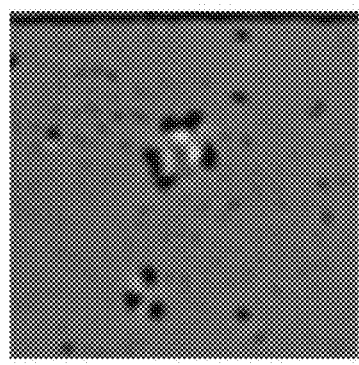
FIG. 4C

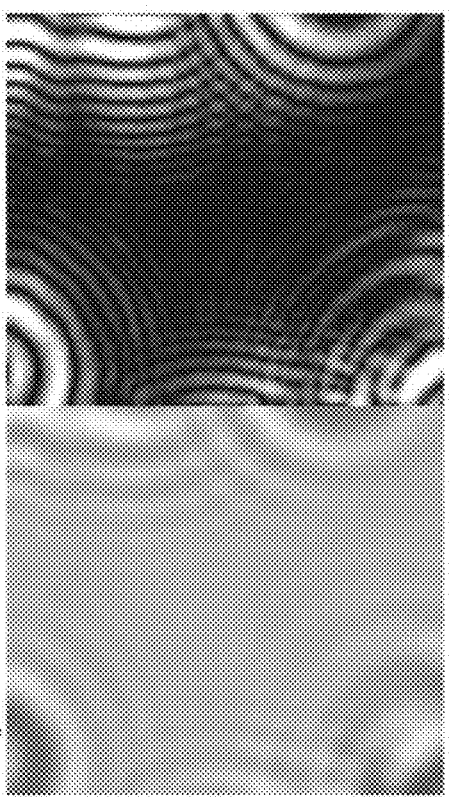
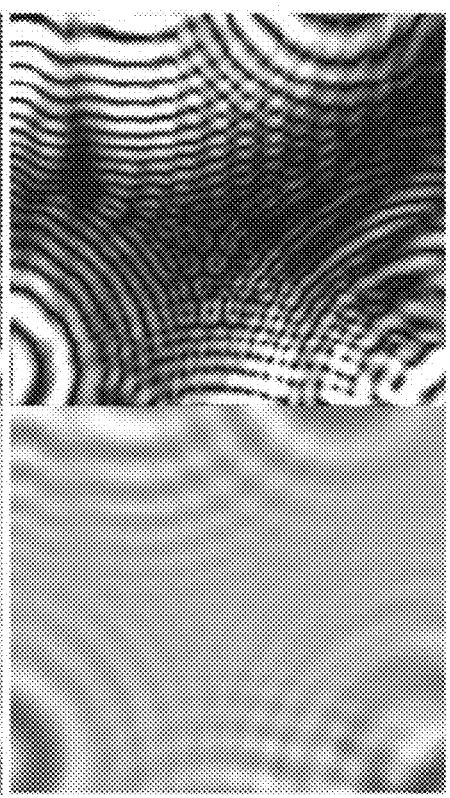
FIG. 5C
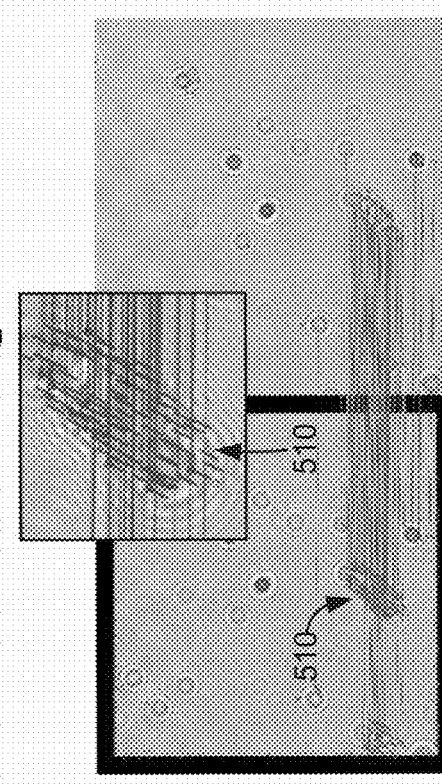
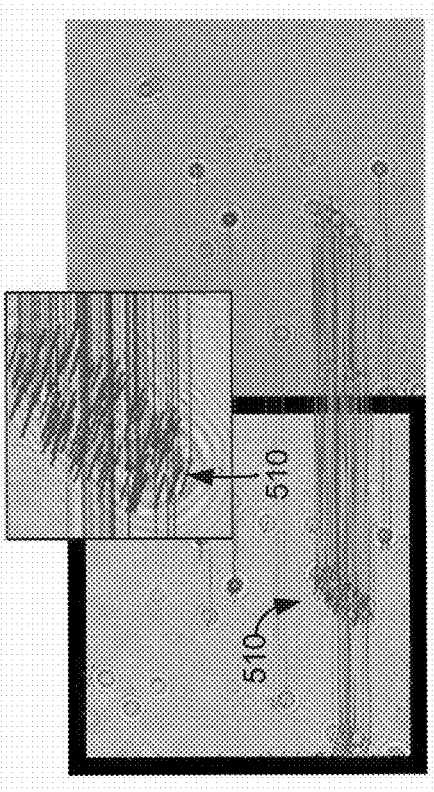
FIG. 5A
FIG. 5B

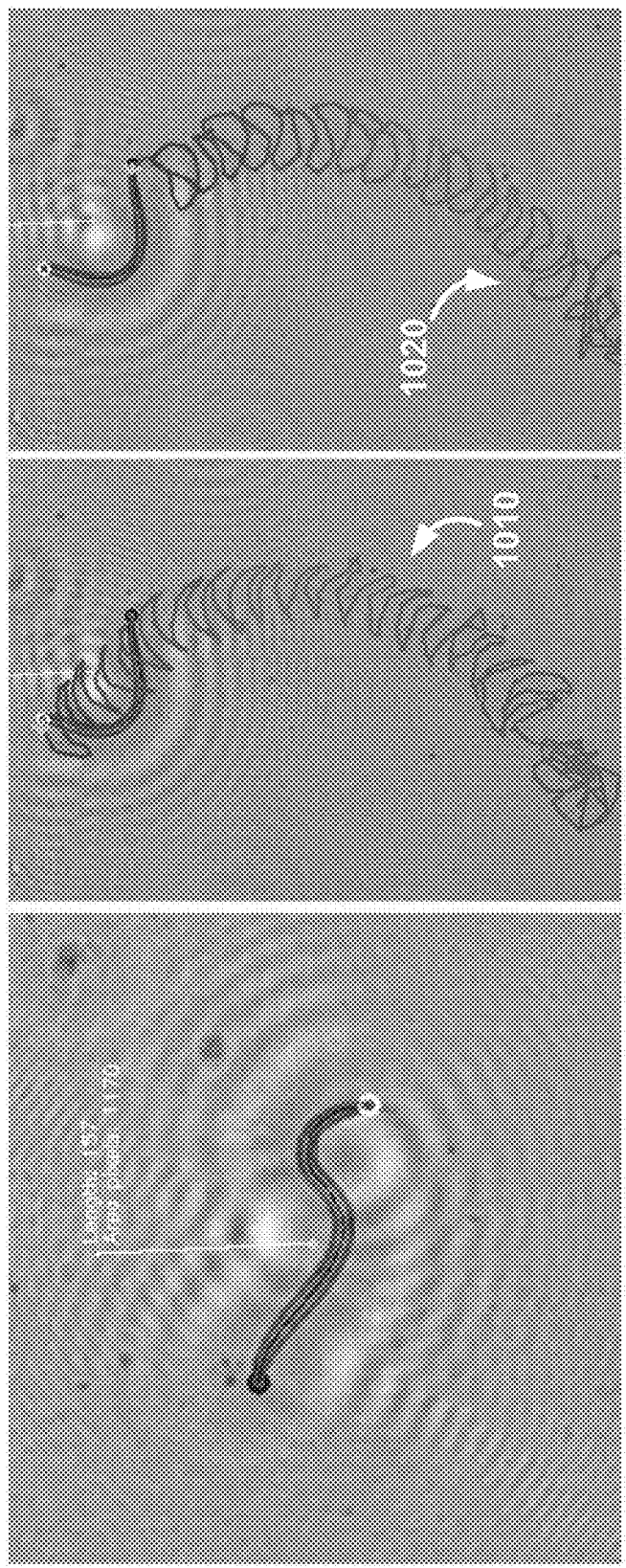

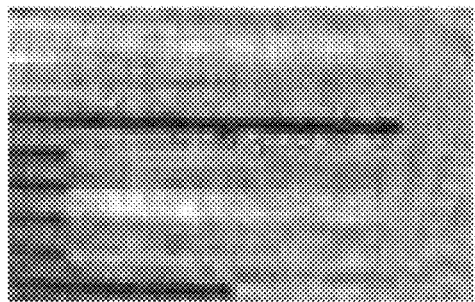
(A1)
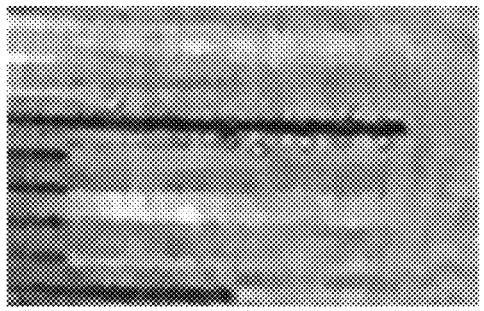
(B1)
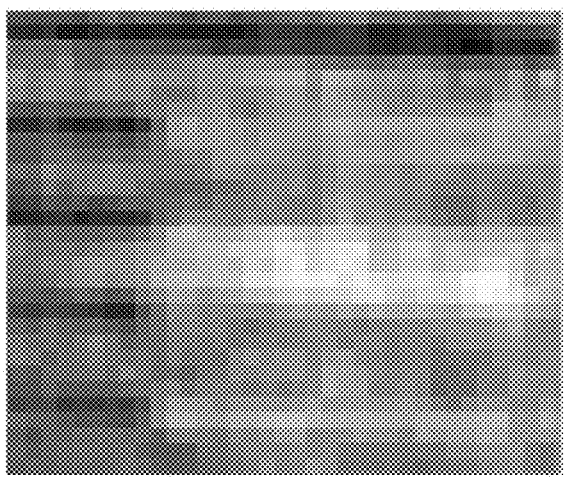
(A2)
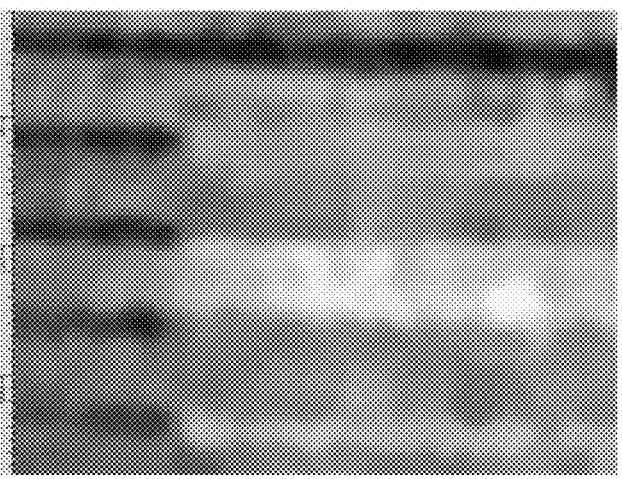
(B2)
FIG. 14

| (N°) Reference Image | (N°) Test Image | SNR [dB] | PSNR [dB] | RMSE | MAE |
|---|---|---|---|---|---|
| (1) frame-10.bmp | (1) frame-1.bmp | 28.693813... | 35.079555... | 4.44040677 | 2.81339286 |
| (1) frame-10.bmp | (1) frame-20.bmp | 31.567962... | 37.953704... | 3.18944657 | 2.01438492 |
| (1) frame-10.bmp | (1) frame-30.bmp | 32.728827... | 39.114569... | 2.79043594 | 1.74962798 |
| (1) frame-10.bmp | (1) frame-40.bmp | 33.188381... | 39.574123... | 2.64663702 | 1.67338790 |
| (1) frame-10.bmp | (1) frame-50.bmp | 30.168059... | 36.553801... | 3.74723112 | 2.33663194 |
| (1) frame-10.bmp | (1) HR.bmp | 24.008349... | 30.394091... | 7.61545721 | 4.25530754 |

FIG. 15

| (N°) Reference Image | (N°) Test Image | SNR [dB] | PSNR [dB] | RMSE | MAE |
|---|---|---|---|---|---|
| (1) HR.bmp | (1) HR.bmp | Infinite | Infinite | 0 | 0 |
| (1) HR.bmp | (1) frame-1.bmp | 23.441454... | 29.735770... | 8.11728572 | 4.67187500 |
| (1) HR.bmp | (1) frame-10.bmp | 23.995751... | 30.290067... | 7.61545721 | 4.25530754 |
| (1) HR.bmp | (1) frame-20.bmp | 23.821816... | 30.116132... | 7.76949353 | 4.38467262 |
| (1) HR.bmp | (1) frame-30.bmp | 23.873513... | 30.167830... | 7.72338781 | 4.31138393 |
| (1) HR.bmp | (1) frame-40.bmp | 23.932475... | 30.226791... | 7.67113774 | 4.30597718 |
| (1) HR.bmp | (1) frame-50.bmp | 23.557987... | 29.852304... | 8.00910785 | 4.49625496 |

FIG. 16

| Assessment | Description | Formula |
|---|---|---|
| SNR | Signal-to-noise ratio expressed in dB | $SNR = 10 \cdot \log_{10} \left\{ \dfrac{\sum_{0}^{n_x-1} \sum_{0}^{n_y-1} [r(x,y)]^2}{\sum_{0}^{n_x-1} \sum_{0}^{n_y-1} [r(x,y) - t(x,y)]^2} \right\}$ |
| SNR | Peak signal-to-noise ratio expressed in dB | $PSNR = 10 \cdot \log_{10} \left\{ \dfrac{\max(r(x,y))^2}{\frac{1}{n_x n_y} \sum_{0}^{n_x-1} \sum_{0}^{n_y-1} [r(x,y) - t(x,y)]^2} \right\}$ |
| SNR | Root mean square error | $RMSE = \sqrt{\dfrac{1}{n_x n_y} \cdot \sum_{0}^{n_x-1} \sum_{0}^{n_y-1} [r(x,y) - t(x,y)]^2}$ |
| MAE | Mean absolute error | $MAE = \dfrac{1}{n_x n_y} \cdot \sum_{0}^{n_x-1} \sum_{0}^{n_y-1} |r(x,y) - t(x,y)|$ |

FIG. 17

| (N°) Reference Image | (N°) Test Image | SNR [dB] | PSNR [dB] | RMSE | MAE |
|---|---|---|---|---|---|
| (1) reg1.tif | (1) reg1.tif | Infinite | Infinite | 0 | 0 |
| (1) reg1.tif | (1) reg2.tif | 16.79200298 | 22.09491926 | 16.49959681 | 12.52586199 |
| (1) reg1.tif | (1) reg3.tif | 13.94966416 | 19.25258043 | 22.88707397 | 17.53382567 |
| (1) reg1.tif | (1) reg4.tif | 22.44643953 | 27.74935581 | 8.60501248 | 6.03776513 |
| (1) reg1.tif | (1) reg5.tif | 20.65129768 | 25.95421396 | 10.58055860 | 7.64401695 |
| (1) reg1.tif | (1) reg6.tif | 14.00682979 | 19.30974607 | 22.73693872 | 17.33324939 |
| (1) reg1.tif | (1) optimization.tif | 18.22397099 | 23.52688726 | 13.99184327 | 10.66690315 |

FIG. 21

| | Evaluation Method | | Gradient |
|---|---|---|---|
| IMAGE | Laplace Variance | Tenen Grad | Sharpness |
| reg1.tif | 49.7065 | 224610 | 56.4917 |
| reg2.tif | 67.1008 | 288253 | 68.3059 |
| reg3.tif | 73.0697 | 313834 | 73.0945 |
| reg4.tif | 56.6768 | 250726 | 59.3594 |
| reg5.tif | 60.0375 | 249955 | 59.6244 |
| reg6.tif | 74.6024 | 305482 | 69.5502 |
| optimization.tif | 9.6637 | 217316 | 38.0551 |

FIG. 22

```
// OpenCV port of 'Lapv' algorithm (Pech2000)
float bammPoC::FocusMeasure::varianceOfLaplacian(cv::Mat hrimage)
{
    cv::Mat lap;
    cv::Laplacian(hrimage, lap, CV_64F);
    m_gradient = lap;

cv::Scalar mu, sigma;
    cv::meanStdDev(lap, mu, sigma);

double focusMeasure = sigma.val[0]*sigma.val[0];
    return focusMeasure;
}
//------------------------------------------------------------------------
// OpenCV port of 'TENG' algorithm (Krotkov86)
float bammPoC::FocusMeasure::tenengrad(cv::Mat hrimage, int ksize)
{
    cv::Mat Gx, Gy;
    cv::Sobel(hrimage, Gx, CV_64F, 1, 0, ksize);
    cv::Sobel(hrimage, Gy, CV_64F, 0, 1, ksize);

cv::Mat FM = Gx.mul(Gx) + Gy.mul(Gy);
    m_gradient = FM;
    cv::normalize(m_gradient, m_gradient, 0, 255, cv::NORM_MINMAX, CV_8UC1);

double focusMeasure = cv::mean(FM).val[0];
    return focusMeasure;
}
//------------------------------------------------------------------------
float bammPoC::FocusMeasure::sharpnessFromGradient2((cv::Mat hrimage)
{
    Mat src, gray, dst, abs_dst;
    src = hrimage.cone();

///Remove noise by blurring with a Gaussian filter
    GaussianBlur(src, src, Size(3,3), 0, 0, BORDER_DEFAULT);
    cvtColor(src, gray, CV_RGB2GRAY);

///Apply Laplace function
    Laplacian(gray, dst, CV_16s, 3, 1, 0, BORDER_DEFAULT);
    convertScaleAbs(dst, abs_dst);
    m_gradient = abs_dst;

cv::Scalar mu, sigma;
    cv::meanStdDev(abs_dst, mu, sigma);
    double focusMeasure = sigma.val[0]*sigma.val[0];

return focusMeasure;
}
```

FIG. 24

IMAGING SYSTEMS AND METHODS OF USING THE SAME

CROSS REFERENCE TO RELATED APPLICATIONS

This patent application is a continuation of U.S. application Ser. No. 15/553,630 filed Aug. 25 2017, which is a 371 application of International Patent Application PCT/US2016/019548 filed Feb. 25, 2016, which claims priority from and benefit of the U.S. Provisional Patent Application 62/121,603, filed Feb. 27, 2015 and titled "Imaging Systems and Methods of Using the Same". The disclosure of each of the above-identified patent applications is incorporated herein by reference.

STATEMENT REGARDING FEDERALLY SPONSORED RESEARCH OR DEVELOPMENT

This invention was made with government support under Grants Numbers NIH R01 AI093282 and NIH RO1AI081534 awarded by the National Institutes of Health. The U.S. government has certain rights in the invention.

TECHNICAL FIELD

The present invention relates to implementation of a Point-of-Care medical platform and, more specifically, to the methodology of shadow imaging for use with such medical platform.

BACKGROUND

Shadow imaging is a technique the working principle of which utilizes a capture of optical shadow(s), produced by a specimen (for example, cells on a microfluidic chip or on a glass slide) that is illuminated from the top, with an optical sensor placed directly underneath. From the analysis of the captured multiplicity of shadow images, which are interchangeably referred to herein as hologram shadows, qualitative (for example, shape, type of specimen) and quantitative (for example, number, size) characteristics of the specimen can be derived. This category of the imaging system understandably has operational shortcomings, which include the limit imposed on the optical resolution by the pixel-size of the imaging sensor, which begs a question of devising a methodology capable of improving the quality of shadow imaging. Related art attempted to address such question by employing multiple source of light illuminating the specimen or object and/or acquiring multiple hologram shadows while illuminating the object on different angles and/or collecting the optical data with multiple optical detectors. Each of these approaches understandably complicates the operation and increases the cost of a shadow imaging system. There remains a need in a simplified hardware system and methodology that increases the spatial resolution of shadow images and facilitates optical noise suppression and in-situ visualization at high-frame rates of a specimen under test without affecting the diffraction limit of the imaging system.

SUMMARY

An embodiment of the present invention provides a method for spatially-static shadow optical imaging, in which a single detector of a lensless optical imaging system is positioned to receive an optical shadow cast thereon by an object that is disposed in immediate proximity to the single detector and is irradiated with a single diverging monochromatic wavefront of light. The method also includes a step of acquisition of multiple sets of optical data with such optical imaging system over a period of time. Each set of optical data represents a respectively-corresponding first image of the optical shadow formed with the wavefront at a respectively-corresponding point in time within the period of time. In one embodiment, the spatial positions and/or orientations of the detector, the object, and a light source configured to produce the wavefront remain unchanged during the process of acquisition of optical data. Alternatively or in addition, the wavefront has a rate of spatial divergence, which remains unchanged in time, and an optical axis the spatial orientation of which remains unchanged during said period of time. The method further includes a step of forming a second image of the object from the acquired multiple sets of data, at least in part by anisotropic filtering the multiple sets of data to correct geometrical information of each first image, and to obtains the second image the spatial resolution of which is higher than the spatial resolution of each of the first images.

An embodiment of the present invention also provides an optical imaging system including a point light source configured to produce partially coherent light; a sample holder in direct optical communication with the point light source without any optical component in between; and an optical detection system having an optical detector that is disposed immediately adjacently to the sample holder. Such optical detection system is configured (i) to acquire multiple sets of optical data with the optical detector over a period of time, each set of optical data representing a respectively-corresponding first image of the optical shadow formed at a respectively-corresponding point in time within the period of time, while each of first images corresponding with the multiple sets of data is characterized by a first spatial resolution. The optical detection system is additionally configured (ii) to form, with electronic circuitry that may include a programmable processor, a second image of the object at least in part by anisotropically filtering the acquired optical data to correct geometrical information of each first image such that the spatial resolution of the second image is higher than spatial resolution of each of the first images.

Embodiments of the invention additionally provide a shadow optical imaging method that includes a step of receiving, at a single detector of a lensless optical imaging system, an optical shadow cast thereon by an object that is disposed in immediate proximity to the single detector and that is irradiated with a single diverging monochromatic wavefront of light. The method further includes a step of acquiring multiple sets of optical data with such single detector over a period of time, where each set of optical data represents a respectively-corresponding first image of the optical shadow formed at a respectively-corresponding point in time within the period of time. During such acquiring, a spatial position of at least one of the optical detector, the object, and the light source defined at a first point in time within the period of time differs from that defined at a second point in time within the period of time. The method further includes a step of forming a second image of the object from the first images, with a computer processor, by minimizing a cost-function that at least partially represents a degree of blurring of each first image, to obtain the second image characterized by spatial resolution that is higher than the spatial resolution of any of the first images.

BRIEF DESCRIPTION OF THE DRAWINGS

The invention will be more fully understood by referring to the following Detailed Description of Specific Embodiments in conjunction with the not-to scale Drawings, of which:

FIGS. 3A, 3B illustrate an LR sub-pixel generator for an arbitrary input signal. In FIG. 3A, individual squares of the red grid 310 represent individual sensor cells of the light-acquisition device (an optical detector). Intensities of light captured by individual cells are averaged over time. In FIG. 3B, the LR-set of images is shown obtained as a results of small shifts of the sensor-cell grid 310 with precision of 1 pixel and k=n=6 (along x- and y-axis, respectively). The total number of images in the resulting LR-set is 36.

FIGS. 4A, 4B, and 4C provide an example of implementation of the super-resolution method to multiple LR images. The input image (FIG. 4A) representing a continuous optical signal is digitized into 36 LR images with small spatial shifts in the plane of the detector defined between the images (FIG. 4B), and then combined using to produce a single HR image (FIG. 4C).

FIGS. 5A, 5B, and 5C provide illustrations of implementation of algorithms for image registration (FIGS. 5A, 5B) and optimization (FIG. 5C), respectively. Image registration is performed by tracking the corresponding key-points between a candidate and a reference image as shown in FIGS. 5A and 5B. Red lines 510 are related to the displacement vector for each particular key-point, used to compute the global wrap transformation. In FIG. 5C, the optimization step is demonstrated, where the minimization of a cost-function is performed to achieve a higher level of contrast and matching of pixels among holograms. The algorithm is configured to find random real values, which correspond to plane transformations on the LR set, the quality of which is measured with the cost function. An example of poor correspondence of a particular candidate solution is shown in the left side of FIG. 5C as producing a blurred effect of the holographic signal. On the other hand, high-quality solutions tend to minimize the cost function, and then, consequently increasing the sharpness level and holographic fringes of the resulting optimized hologram (the right side of FIG. 5C). In holography the quality of diffracted images is proportionally associated with the number of holographic fringes, thus minimization of the cost function leads to high-quality solution for sub-pixel image registration.

FIGS. 10A, 10B, 10C illustrate the computational interpretation and image-feature extraction over time, according to an embodiment of the invention. FIG. 10A has a caption denoting the nematode body in length and area in pixels, representing the volume of the body. To indicate the beating frequency over time, FIGS. 10A and 10B show the tracking of movement for head and tail of the nematode, respectively;

FIG. 14 provides information for visual comparison of an LR image after numerical diffraction diffracted (frames A1, A2) and an HR diffracted and computationally resolved image (frames B1, B2). Resolution increment factor used to obtain HR counterpart is f=4. Resolution chart line-pairs on LR diffracted image is about ~6 pixels for 10 micrometers, while in the HR image counterpart it's about 2 pixels <~1 micrometer;

FIG. 15 provides an illustration for signal-to-noise (SNR) assessment of results produced with the use of the static embodiment of the invention. Reference frame was used as a reference and then compared against each other LR image, and also to a HR diffracted hologram computationally resolved. The SNR for LR set varies from ~28 to 30 dB, while in the HR image it is 24 dB. Peak SNR in the LR set varies from 35 to 39 dB and for the HR is 30 dB. RMSE and MAE metrics are also presented, both showing higher levels for HR image, since its signal is more homogeneous than in LR images. These last two indexes tend to identify considerable deviations from a specified pattern;

FIG. 16 provide an additional illustration for assessment SNR for a static embodiment. HR diffracted image is used as reference image. The SNR values are equally distributed when compared to LR counterpart images, once HR is formed from the same amount of data from LR set.

FIG. 17 lists SNR and error metric equations used to compute indexes in FIGS. 15 and 16. Reference image is denoted by r, and t is a query image to be compared;

FIG. 21 addresses SNR for multi-frame super-resolution approach based on shifts of the light-source, for holograms of FIG. 20. No significant differences for HR when compared to a reference image (reg1.tif). This can be explained due the nature of the method which introduces new information from the set of LR, corresponding to the holographic fringes;

FIG. 22 summarizes sharpness measures associated with all raw holograms in FIG. 20 (not on Prewitt compass);

FIG. 24 lists a portion of the C++ source code used for determination of a sharpness measure used for holographic measurements.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with preferred embodiments of the present invention, methods and apparatus are disclosed for lensless wide-field microscopy imaging platform, uniting the digital in-line holography (DIH) processes with computational multi-frame-pixel super-resolution methodology. In particular, multiple low-resolution (LR) hologram shadows of a specimen are captured with the use of the only, single coherent-illumination source while relative spatial displacements are introduced between the light-source and the specimen (in one implementation—spatial displacements of the light source with respect to the specimen, within the distance of a few millimeters). The LR imaging frames are recorded into a LR dataset with varied pixel content. While all LR frames or hologram shadows are essentially the same, the relative displacements play an important role by allowing to exploit sub-pixel-level optical information, and cause the optical sensor cells to capture different optical intensities at each relative change of position between the light source and the specimen. A high-resolution (HR) image or hologram is then obtained by resolving such displacements based on feature registration and sub-pixel optimization. LR images are first spatially aligned and registered on the same planar domain, followed by optimization of sub-pixel information based on fast-convergence approach used to find the global optimum solution. The obtained HR hologram is then decoded by a phase-retrieval method into an HR shadow image of the specimen at different height positions. A set of empirical results evidenced that the proposed methodology allows to obtain, staring with captured shadow images via a lensless platform (a system devoid of a lens element; i.e. lenslessly), an image with spatial resolution corresponding to resolving of less-than-1-micron size features on a field of view of about 30 mm$^2$.

Example of an Experimental Setup.

Figure 1:
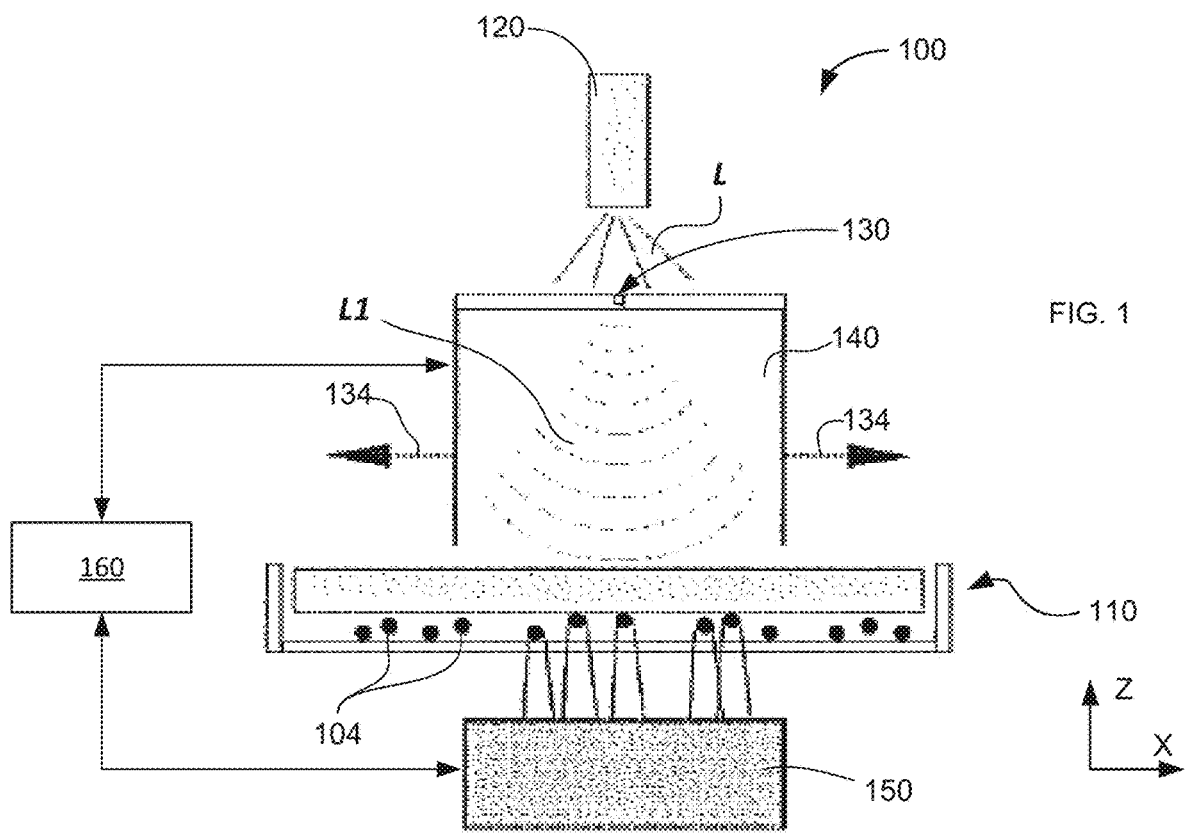
FIG. 1 is a schematic diagram illustrating an optical imaging setup configured to capture hologram shadows.

As shown schematically in FIG. 1, the specimen/sample 104, held on or with a sample-holder 110 (such as a microfluidic chip and/or under the cover glass), is illuminated with light L emitted by the only (single) light source 120 (in one example—an LED configured to generate UV light at about 385 nm) and diffracted at a pinhole (for example, circularly shaped) 130 to form the optical beam L1 with a diverging wavefront. The relative displacements (indicated by arrows 134) between the point light source PLS) formed by the pinhole 130 and the sample 104 can be optionally effectuated with the use of an xy-positioning stage 140. The only imaging sensor (optical detector) 150 present in the system 100 is disposed immediately under and as close as possible to the sample as possible (that is, in immediate proximity to it, leaving no additional space between the sample holder 110 and the detector 150 sufficient to insert an additional optical component) to capture holographic shadow images of the sample 104. Generally, the optical shadow of the specimen 104 is cast onto the detector 150 continually, without cessation or interruption in time. In one implementation, the detector 150 was the CMOS 10 megapixel monochromatic sensor with dimensions of about 6.4 mm by 5.9 mm (and, accordingly, the sensitive area of about 30 mm$^2$), the spatial resolution of 3840×2748 pixels and 1.67 micron pixel size.

In an embodiment where a spatial shift is introduced between the axis of the wavefront of the diverging beam of light L1, it is appreciated that either a point light source can be moved relative to the fixed-in-space combination of the specimen and the sensor or, alternatively, the combination of the specimen 104 and the sensor 150 can be moved with respect to the PLS. The latter implementation requires disposing of the combination of the specimen 104 and the sensor 150 on an independent positioning stage, which is not shown for the simplicity of illustration. When a point-source is shifted with respect to the sample, the sample ends up being illuminated from varied perspectives but at the same illumination angle, on x- and y-axis directions independently, and parallel to the plane of the detector. To acquire multiple images, shifts of the single point-source are performed within a fixed predetermined step-size (for example, within the square area defined by 7×7 individual positions, totaling 49 individual LR images or observations of the sample). Arbitrary displacements are also possible to be performed in number and positions, but large step-size shifts may penalize the system, possibly causing aberrations and distortion of individual holographic shadows. Arbitrary displacements inside of a fixed physical area (e.g., ~2.5×2.5 cm) are admissible with several frames captured with slightly small shifts of the point-source.

Alternatively, as discussed below in more detail, the multiplicity of individual LR-images of the specimen can be obtained statically—as a result of stationary observation of multiple LR images of the specimen 104 and image data processing involving the summation of image frames.

Electronic circuitry and data-acquisition platform 160, equipped with tangible non-transitory storage medium, carrying an appropriate program code thereon, is operably connected with positioning stage(s), optical detector 150, and optionally with a light source, to govern their operation, to collect optical data (in a form of an 8-bit raw data, for example), and to perform data-processing as required by embodiments discussed below. It is noted that, collection of monochromatic raw data (data corresponding to monochromatic optical signal) is important for sub-pixel computation because post-processing in raw data difficult the acquisition of a higher resolution signal, once pixel information can be modified in hardware (for instance, gain and gamma correction, anti-aliasing). Also, color-based optical sensors are difficulty to represent properly spatial resolution because they make use of color-filters (such as Bayer-8).

Dynamic Embodiment:

Methodology of Improvement of Resolution of a Shadow Image Based on Sub-pixel Shifts.

The multi-frame pixel super-resolution methodology of the present invention stems from the realization that a multitude of LR observations or images (whether complete or partial) of the object, in which different LR images are obtained under the conditions of small disturbances introduced into the imaging setup in either frequency or spatial domain, contain additional information that, when recovered into an image of the object, increases the resolution of such image above the level of LR.

Accordingly, an idea of the present invention is based on a premise of obtaining an HR image from a set of multiple observations of the same scene, called the LR-set (of images of the scene). Notably, each of the multiple images of the scene or object is obtained as a result of illumination or irradiation of the object with an only, single diverging optical wavefront (produced by the only, single source of light) the axis of which is perpendicular to the plane of the single detector of the imaging system and the angle of divergence of which remains unchanged throughout the process of multiple image acquisition. In other words, the angle at which the object is illuminated with imaging light does not change between consecutively acquired LR images.

An individual LR image is defined as a single and a particular (in time) observation of the scene (that is, a single-shot observation or image), and different LR images of the set, while being the images of the same object or scene, are differentiated from one another by sub-pixel spatial shifts. A sought-after HR image is defined as an image the spatial density of pixels of which is larger than that of any individual LR image from the LR-set. In this manner, a super-resolution method of the invention is used to explore the pixels variations computationally to obtain an HR image from a given LR-set of LR images.

Figure 2:
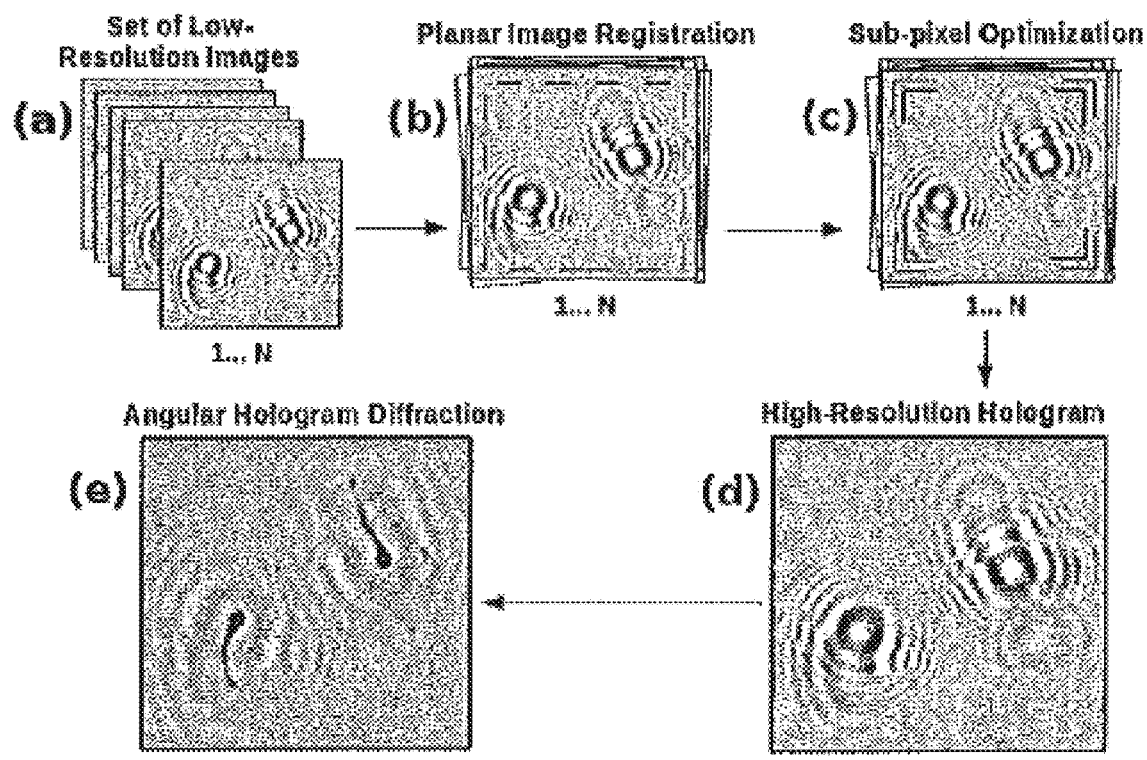
FIG. 2 presents a block-scheme outlining the methodology according to the idea of the invention using shifts of a single light-source.

As was already alluded to above, in application to the hologram shadows of a given specimen 104, a set of LR hologram shadows is obtained with the use of small displacements between the light source and the specimen. FIG. 2 summarizes methodology of the present invention:

First (FIG. 2, block (a)), an LR-set of N hologram shadows is obtained with the use of the embodiment 100 of the shadow imaging system of FIG. 1. While the number N of LR images, required to be acquired for further processing of the shadow imaging data into an HR image, is somewhat arbitrary, it is noted that the larger number LR-set stores more imaging information, consequently increasing the quality of the sought-after HR image. Notably, Extracting sub-pixel (with respect to the pixel size of the optical detector 150) optical information can be obtained from the multiple LR images only when such images, digitized from real shifts of the light-source, are perfectly registered and aligned to a reference frame, under the same bi-dimensional plane with fractions of sub-pixel. Initially, a fast alignment of LR-images from the LR-set is performed with a feature-based registration method (FIG. 2, block (b)) to determine a homography matrix of plane transformations (one for each LR frame, corresponding to the transformations need to wrap candidate to reference frame);

Following is the sub-pixel optimization of a cost function to determine the global optimum point in a search-space (FIG. 2, block (c)). The objective cost-function is formed with two penalizer terms to estimate the quality of the particular registration: a fidelity term to keep locality of the initial registration, and a focus computation term to facilitate fine adjustment and to increase hologram fringes based on a sharpness measure, and to recover information representing both low-spatial-frequency and high-spatial-frequency waves;

As a result of such procedure of hybrid registration of individual LR-images to a reference frame, an HR hologram shadow image is formed, in which low- and high-frequency waves are recovered (FIG. 2, block (d)). The hybrid registration approach is configured to produce the effect of a noise-filter: noise and other undesirable artifacts (such as optical artifacts produced by dust or scratches present in the optical path of light through the system 100) are suppressed over time and space;

At step shown in FIG. 2 as block (e), the HR hologram shadow is decoded, for example with a phase-retrieval method. To this end, angular diffraction calculation, or Fresnel convolution method, for example, may be used to convert the HR holographic image of block (d) to a real, imaginary, phase and amplitude signals.

To provide a generalized example of the results of this process, a computational demonstration of the procedure of digitization of an image, a super-resolution method and the importance of controlled sub-pixel variations in the LR set are illustrated in FIGS. 3A and 3B and FIG. 4.

Here, an LR-image generator was developed to create LR images from an input signal (image), and to effectuate controlled spatial displacements (shifts) over the sensor cells (pixels), thereby simulating the acquisition of a continuous signal (as performed by a digital acquisition device/camera in empirical environment). The input signal shown in FIG. 3A is pixilated by averaging its light intensities with the use of a down-sampling factor k. An LR image estimated from the input signal of FIG. 3A has k-times fewer pixels than the original input signal, as shown in FIG. 3B (a "low resolution #1" image, for example). At the next step, a new distinct LR image of the object is created (a "low resolution #2" image) by displacing the grid 300 (the field of the optical sensor) by 1 pixel unit and thus averaging light intensities into such new LR image. This procedure is continually applied to create pixel-by-pixel shifts in a range of the k×n field. The example shown in FIG. 3A corresponds to a conventional shadow image system (utilizing only a spatial signature of only incoherent light-source as input signal), with k=6 and n=6 and resulting into 36 LR images (the last one being a "low resolution #36" image, not shown), each produced by a particular corresponding spatial shift and containing varied intensity of pixels.

The results presented in these Figures demonstrate the importance of controlled spatial shifts for multi-frame processing to facilitate the capture of sub-pixel information. While information content of each particular image from the LR-set is visually the same as that of another image from the same set, variations in intensity are identified when LR images from the set are assessed on a pixel-by-pixel basis, as shown in FIG. 3A. These variations are then recombined into a single image with higher pixel-based resolution. Usually, a super-resolution method may require the assessment of a registration method, combined with deconvolution or sharpness algorithms to recover local information and to reduce blurring effect. Data transfer by an optical device is known to be bounded by the diffraction limit. Spatial resolution, on the other hand, can be increased near to this limit by combining information from multiple samples. In FIGS. 4A, 4B, 4C, the application of a super-resolution method applied to the LR set previously illustrated in the FIGS. 3A, 3B is demonstrated. The input signal is shown in FIG. 4A, where 36 LR images were decomposed (k=6,n=6), as shown in FIG. 4B). After having been recombined, the LR-set of 36 LR images produces a single HR image of FIG. 4C. (The HR image of FIG. 4C was obtained using the specific embodiment employing random movement of the point-source, as discussed below, except the registration procedure, which is already known and every single image is a decimation of 1 pixel unit, and followed by averaging of the LR-set with proper registration representing optimized alignment of the individual LR images).

Notably, when the sought-after HR image of FIG. 4C is compared to any individual LR image (FIG. 4B), a significant level of details and geometry of image information can be observed. An LR image closely represents the real condition and capacity of an electronic imaging device to capture light intensities from the environment, and the super-resolution implementation is the same used to process real images. It can be observed that the resulting HR image of FIG. 4C indicates some level of loss of optical information and blurring in comparison with the input signal of FIG. 4A. This effect, however, is expected due the digitalization procedure and size of the sampling pitch used in the red grid 310 of FIG. 3A.

In the following example, a specific situation of random movement of the point light-source, formed by the pinhole of the system 100 of FIG. 1, is used to produce a set of LR images for a digital holographic microscopy platform. Everything is static in this specific case except the point-source itself, which is displaced in an arbitrary manner to project shadows of the specimen 104 on the plane of the pixelated detector 150. This platform has as advantage the use of a single point-source (instead of multiple light-sources such as LEDs organized into an array of light sources), lack of complex repositioning or spatial displacement mechanism, and the use of algorithms for automatic registration and sub-pixel optimization. The generally completely arbitrary, not-predetermined displacements (spatial shifts) are resolved with the use of the presented hybrid computational approach.

In reference to the shadow imaging system of FIG. 1, a $CO_2$ laser cutter engraver was used to build a basis with ~10×10 $cm^2$ area and to couple the sensor 150 placed underneath. On the same basis, the sample 104 to be imaged (in microfluidic chips or glass slides) was accommodated with the minimized between the sample and the plane of the detector 150. The positioning stage 140 was configured to shift the point-source formed by light L emanating through the pinhole 130 to illuminate the sample 104 from varied perspectives, independently defined by different positions of the pinhole along x- and y-axes the same plane parallel to the plane of the detector. To acquire multiple images, shifts of the single point-source were performed within a fixed predetermined step-size, inside of a 7×7 spatial grid or matrix within an area of about 1 $mm^2$, and a total of 49 distinct observations of the sample was then obtained with varied content in pixels.

Arbitrary displacements inside a chosen fixed physical area (e.g., ~2.5×2.5 cm) were admissible with several frames captured with slightly small shifts of the point-source. It is noted that the large displacements may facilitate the presence of aberrations on hologram shadows, due to the changes in incident angle of wavefronts impinging on the detector.

Computational approach to interpret multiple frames was developed in C++ and R Statistical Language, to read a data directory containing the data representing the acquired set of LR images, register the LR images by a matrix of transformations, and to perform sub-pixel optimization automatically, on a predetermined sub-window area. Due to the nature of the approach, a static matrix of transformation to wrap planes cannot be fixed like in other state-of-the-art approaches, since the employed point-source moves for every particular LR image (point-source is not fixed and may varies for each acquisition procedure), thus a hybrid approach was implemented to register automatically the LR set onto the same planar domain using: (a) Fast Image Registration of the LR set using a feature-based approach; (b) Optimization procedure based on area-matching approaches (minimization error).

Fast Image Registration.

Image registration is the process of computing an optimal transformation between two or more images and spatially aligning such images into a unique coordinate system. This can be done by a set of spatial referencing operations such as translations and rotations of images looking for a complete matching against a given reference image. Since during the acquisition of different images from the LR-set the only changes in the experimental setup are very small displacements of the point lights source, the scene for each of the individual LR images remains substantially planar. Since individual LR images are acquired with the same intensity of illuminating light L1, and at the same source-to-specimen distance, the only change occurring in the image information between the two different LR images is that representing the displacement step-size. Therefore, the LR images can be aligned with the use of feature-based or area-based methods. Area-based methods require some error metric to measure the quality of matching of individual images with one another. Feature-based methods register images based on a set of sparse feature points (minimum 4 key points with no 3 of such points being on the same straight line) that are then matched to solve the homography.

The used in the embodiment fast image registration employed a feature-based registration procedure performed, in reference to FIGS. 5A, 5B, as follows:

The key-points were detected for the both reference and candidate images, and a feature vector was calculated. The Speeded Up Robust Features (SURF) algorithm, based on the sums of Haar wavelets and inspired on the Scale-Invariant Feature-Transform (SIFT) algorithm, was used to locate the relevant key-points. (See, for example, Goshtasby A. A., Image registration—Principle, Tools and Methods, in Advances in Computer Vision and Pattern Recognition, Springer, 2012, which is incorporated herein by reference);

The feature-vectors for the reference and candidate images were matched by a neighborhood function. The Fast Approximate Nearest Neighbor matcher (FLANN) was used to correlate key-points;

To select only high-quality matches, the obtained results were validated by a clustering technique designed to remove outliers' points. These outliers could be detected with a least-square fitting based on geometrical distances and angular coefficient between reference and candidate images of the LR set;

The resulting matrix-matching was computed for every single LR image using the Random Sample Consensus algorithm (see Goshtasby, referenced above) to estimate the homography matrix. With the obtained homography matrix, the reference candidate LR images were wrapped. Because each LR image required a respectively-corresponding homography matrix, the procedure is applies to N−1 LR images.

Sub Pixel Optimization.

The next procedural step in the methodology of the invention includes the optimization procedure performed with the use of an area matching approach. Area matching approaches seek to minimize energy E (cost function) that represents the estimation of a registration error, and are generally time-expensive. The process must find a compromise among the penalizer terms of the model while minimizing the value of E. Here, two penalizer terms were used to define the energy cost-function. The first term, referred to as data term or fidelity term, penalizes deviations of a candidate HR image from the set of LR images, and represents the assumption that results must be as close (in position, after having been registered) as possible to the original LR data during the minimization. The second term is referred to as a sharpness measure, and is designed to indicate when a candidate solution has adequate holographic propagation. For a candidate HR-image solution I associated with the LR images from the LR-set, the energy E (the error of sub-pixel alignment) of this solution is defined according to:

$$E(I,L)=\alpha_i \Sigma_{i=1}^{m}(L_i-I)^2 + \beta(\nabla I) \tag{1}$$

In Eq. (1), L is the set of LR images transformed by a set of decision continuous variables, having m as the cardinality of L. First term is a fidelity term measuring the quality of approximation between each LR image to I, being related to spatial locality, penalizing solutions with poor correspondence (e.g., decision variables trying transformations far from the ideal matching). The second term $\beta(\nabla I)$ is a focus measure representing the sharpness of the image and used to compute the relative degree of focus of an image. This term and can be obtained by the sum modified-Laplacian method (LAPM). Parameters $\alpha$ and $\beta$, like in many variational models formulated in related art, control the relative importance of each penalizer term. As the LR set is obtained upon spatial displacements (shifts of the light-source), diffraction patterns may change according to the position of the light-source and their shape, and holographic fringes may be slightly different for each LR image. The aforementioned equation is similar to the general formulation for super-resolution presented by other variational models, but with the addition of a term specifically designed to measure sharpness improvement, also associated with increase fringe propagation (as shown in FIG. 5C).

FIGS. 5A, 5B, and 5C illustrate the registration and optimization procedures as discussed. Here, the fast registration is performed using the above-described feature-based algorithm, with a set of key-points spatially located to compute a homography matrix (i.e., a matrix of transformations to wrap any two planes). The homography matrix is used as an initial guess solution for the second step, where a fine adjustment in a sub-pixel level is performed. The aforementioned steps present as main goal to compute the center of gravity of an intensity distribution, aligning the LR set based on the minimization of a cost-function. Optimization is performed with a gradient descent method, where a search-space of variable decimation (admissible translation in x and y positions, rotation) is populated by a Continuous Ant Colony Optimization (ACO) approach, designed to find the global optimum solution after a number of iterations is completed (see, for example, Socha K and Dorigo M., Europ. J. of Operational Res., 185 (3), 20018, pp. 1155-1173; incorporated herein by reference).

Figure 18A:
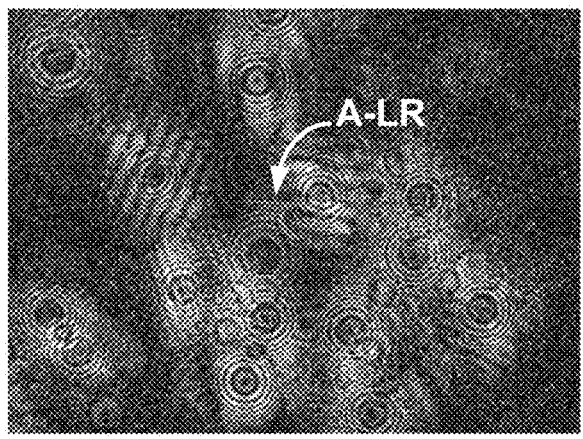
FIGS. 18A, 18B, 18C, 18D, 18E, and 18F provide comparison of a single-shot low-resolution hologram against its high-resolution counterpart, computed from 49 LR images.
Figure 18B:
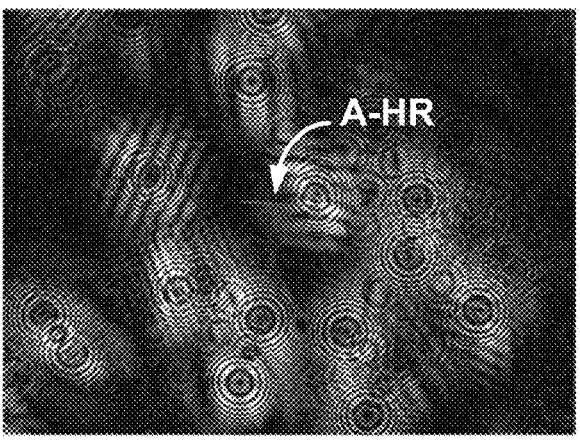
Figure 18C:
Figure 18D:
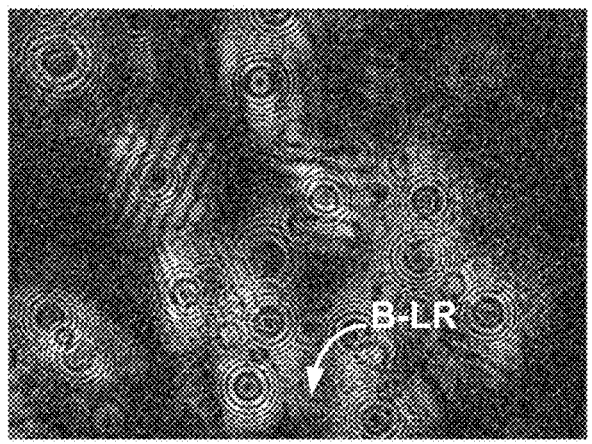
Figure 18E:
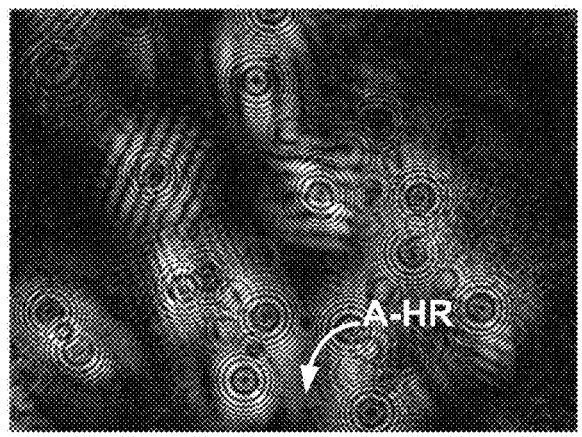
Figure 18F:
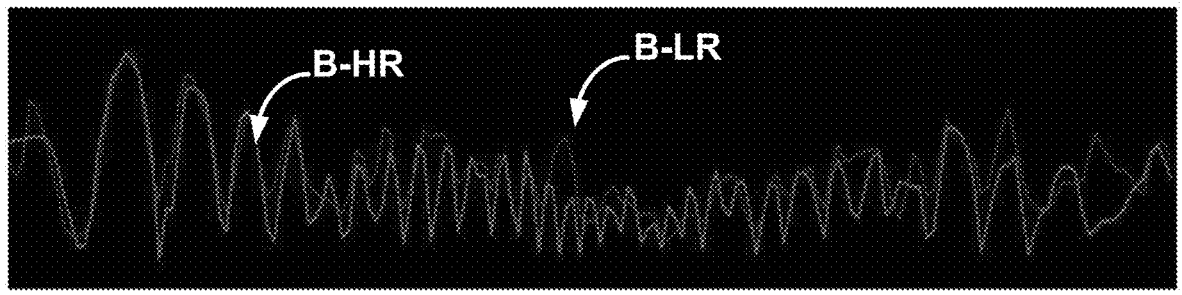

The results of the fast registration and optimization procedure employed in this invention are shown in FIGS. 18A, 18B, 18C, 18D, 18E, and 18F. FIGS. 18A and 18D represent LR holograms applied to a Prewitt compass operator used to highlight soften gradient differences in such holograms. The HR computerized resolved images, obtained from a set of LR images of FIGS. 18A and 18D, respectively, using the dynamic embodiment of the invention are shown in FIGS. 18B, 18E. FIGS. 18C and 18F illustrate the pixels mean intensity profiles plotted for the LR and HR images (holograms) along the corresponding marked paths A-LR, A-HR, B-LR, and B-HR, to capture mean intensities of pixels around those regions. Analyses of these profiles reveal the holographic fringes behavior for each particular hologram (LR and HR). The larger is the number of cycles the better is the quality of the holographic signal after the numerical diffraction treatment is applied. In FIG. 18C, the A-HR profile counts 16 cycles of fringes while for the A-LR counterpart only 6 can be analyzed in a periodic manner. Periodic fringe information, additionally, achieves lower value intensities for the HR case when compared to the LR case, also demonstrating a better definition for low and high-holographic frequencies. In the case depicted in FIG. 18F, the profile lines B-LR and B-HR are shown. A person of skill in the art observes repeatedly the gain in holographic propagation and definition of wave cycles when compared to a single shot frame, which is affected by noise.

In further reference to FIGS. 18A through 18F, the implementation of embodiments of the present invention generates an unexpected advantage over the procedures of related art in that substantial noise suppression occurs. It would be appreciated by the skilled artisan that background areas of HR holograms are less subjected to the effect of peaks of isolated pixel intensity gradients, as show by the LR case. Background regions are darker regions in intensity suppressing any kind of inhomogeneities, due to the image summation procedure performed from consecutive homographic images after aligned in a fine adjustment of sub-pixel information.

Figure 19:
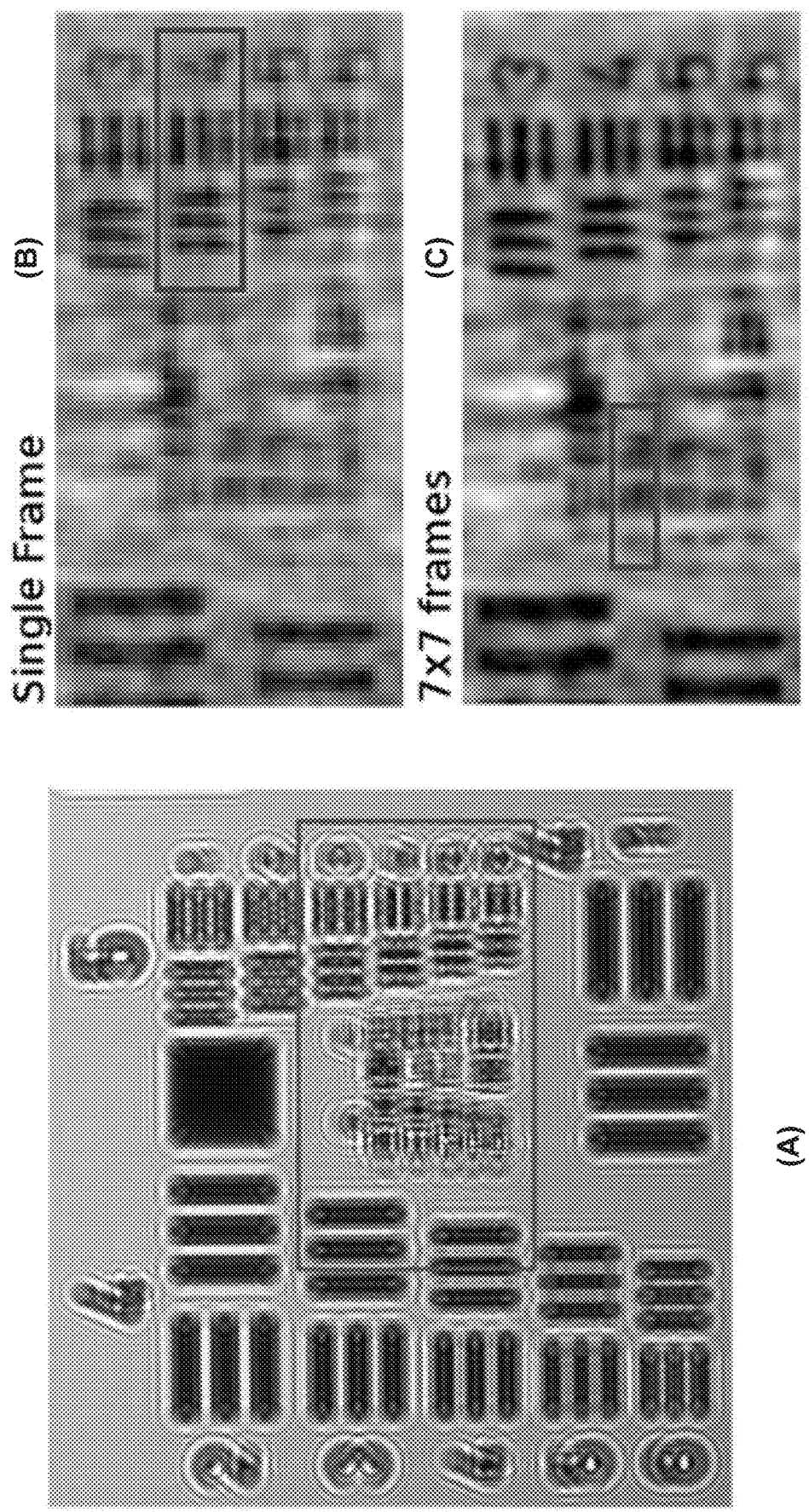
FIG. 19 (frames A, B, and C) illustrates images of the USAF-1951 resolution chart. Visible line-pairs for a single-shot hologram is 7-4, while for the higher-resolution counterpart is 8-3, corresponding to approximately 1.55 micrometers.

FIG. 19 (presenting frames A, B, and C), illustrates the spatial resolution measured with the use of a physical USAF1951 resolution chart and capture from multiple observations of the scene. The hologram shown in frame (A) was diffracted numerically using its LR and HR parts (which are illustrated shown at the right side of FIG. 19 in frames (B) and (C), respectively). The LR result of frame (B) displays line-pairs 7-4 clearly visible with some resolution aspect ratio. After the optimization procedure was applies, from 49 observations and with the use of the dynamic embodiment of the invention, visual information for line pairs 8-3, corresponding to approximately 1.55 micrometers, was achieved.

Figure 20:
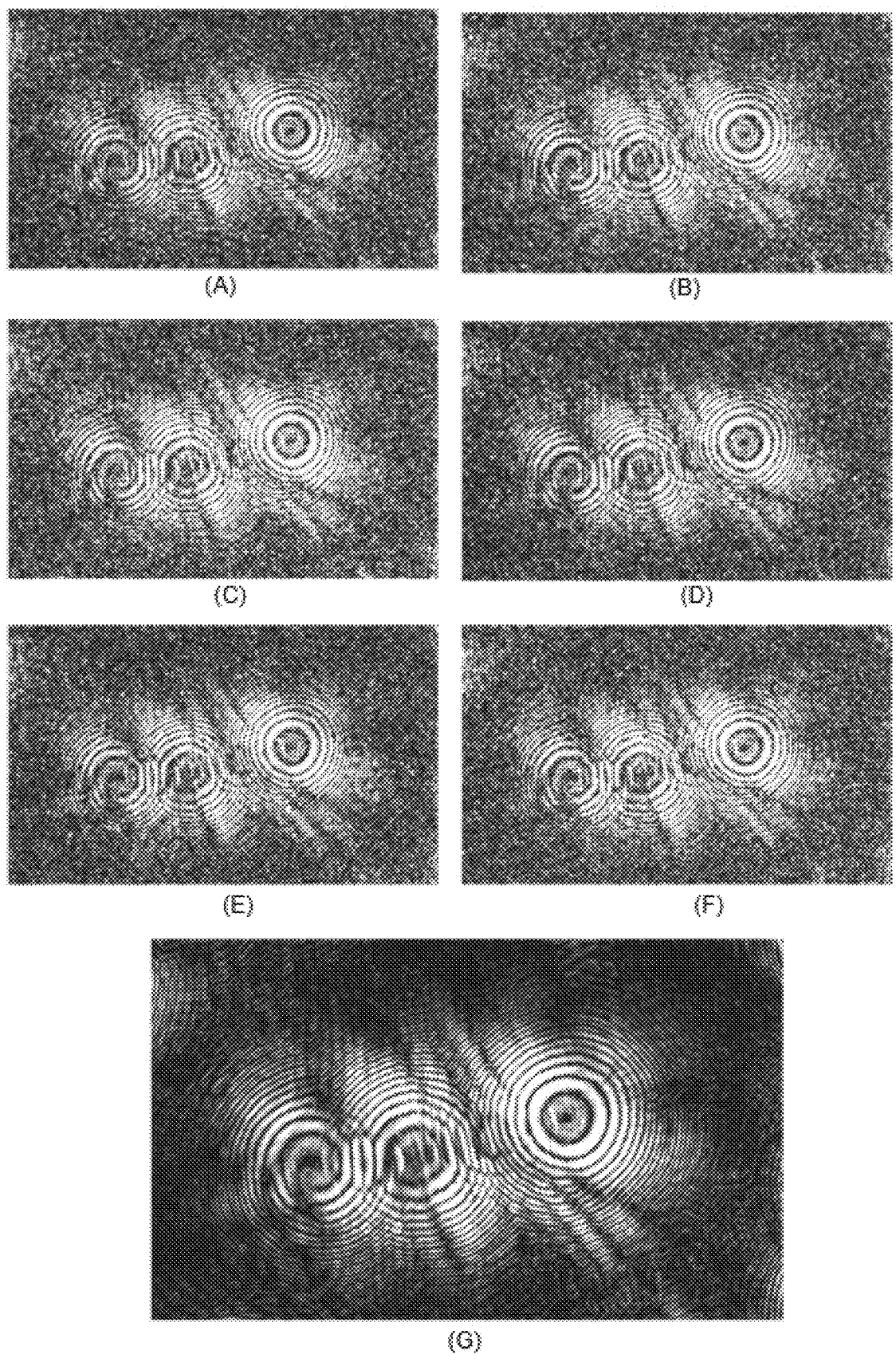
FIG. 20 (frames A, B, C, D, E, F, G) facilitates comparison of LR holograms applied to Prewitt compass (frames A through F), and a HR hologram computationally resolved (frame G).

Noise suppression measurements were also performed with the use of the dynamic embodiment of the invention. The comparison was performed using a chosen LR image (from the LR images of frames A through F of FIG. 20)

followed by a comparison of SNR, PSNR, RMSE and MAE indexes, as illustrated by FIG. 21. The obtained results display no significant differences for the HR image when compared to the former LR set. It is appreciated that as a result of square-error-based SNR estimation and due to the nature of the registration method additional holographic fringes designed for holographic fringe propagation may be introduced.

Figure 23A:
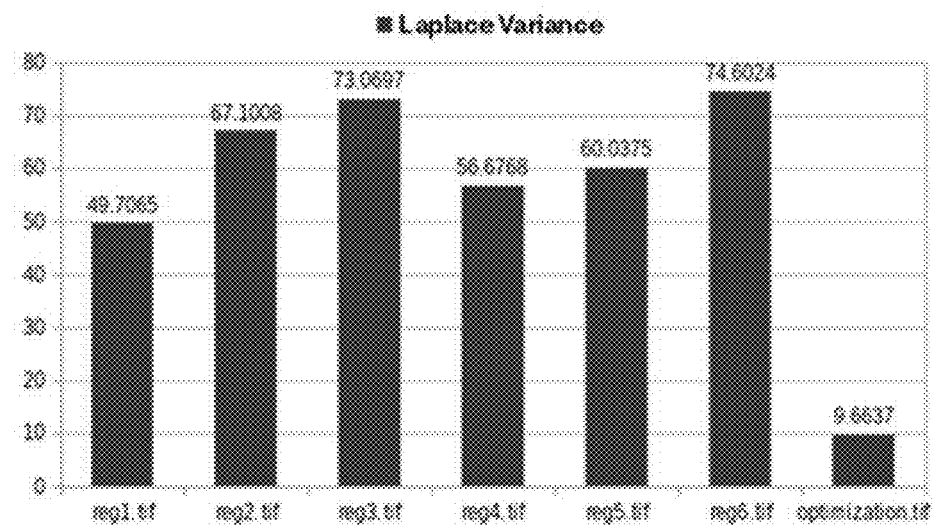
FIGS. 23A, 23B, 23C illustrate sharpness measures associated with all raw holograms in FIG. 20 (not on Prewitt compass)
Figure 23B:
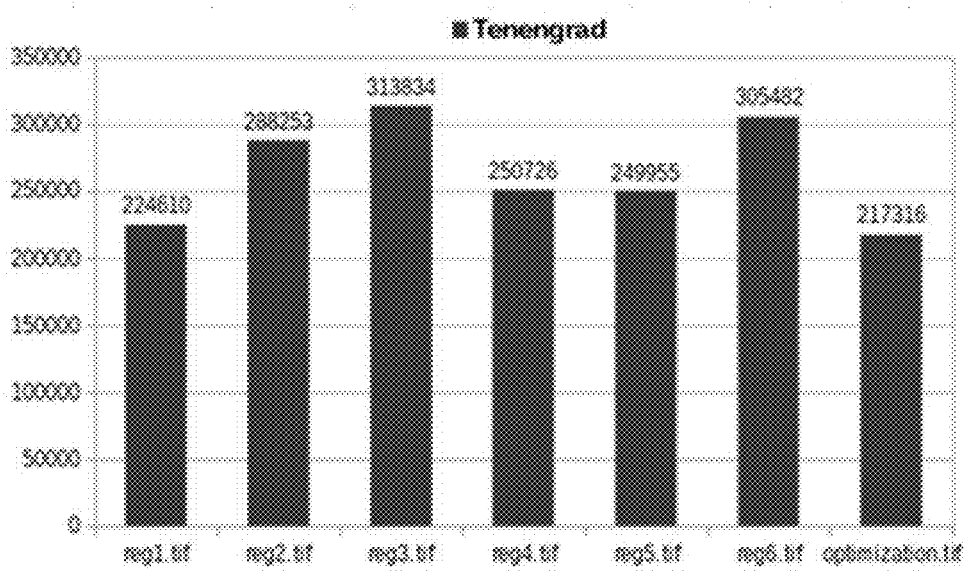
Figure 23C:
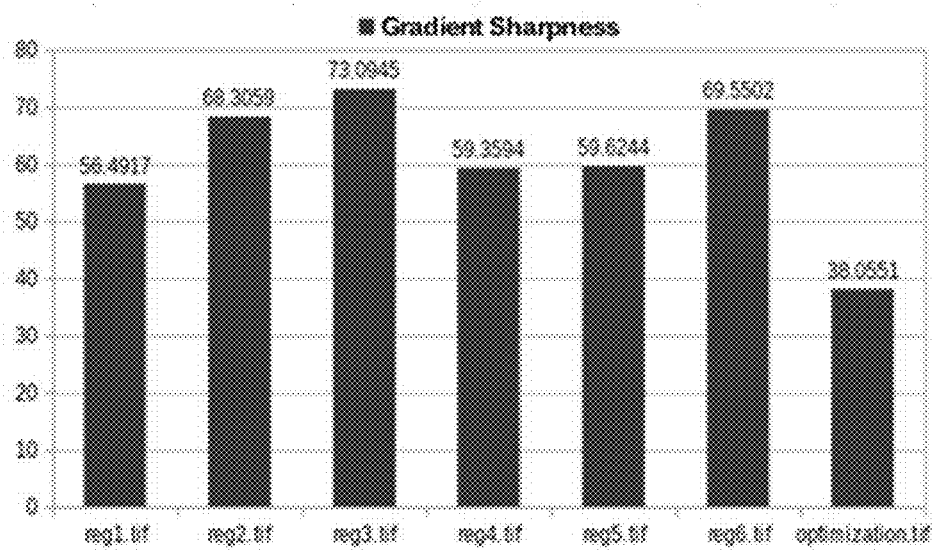

A new measure was performed taking into account noise suppression estimation and sharpness level of LR and HR images based on Laplace-operator(s) (discussed, for example, in S. Pertuz, D. Puig, and M. A. Garcia, "Analysis of focus measure operators for shape-from-focus," Pattern Recognition, vol. 46, no. 5, pp. 1415-1432, 2013). This category of operators are well suited to compute the sharpness level, or in other words, the focus level of an image can represent, by computing two partial derivatives from the image. Sharpness, being a photographic image quality factor, determines the amount of details an imaging system is able to reproduce (Nayar, "Shape from Focus", 1994). As illustrated in FIGS. 22, 23A, 23B, and 23C, implementation of the Laplace-operator based methodology has demonstrated accurate estimations of noise suppression and assessment of sharpness of both HR and LR images. FIGS. 23A through 23C provide graph plots for individual categories of evaluation methods. For the three sharpness estimators, the HR image has a better level of focus degree, involving noise suppression and sharpness level, when compared to the LR set. Laplace-based operator methodology was realized in C++ as shown in FIG. 24.

Static Embodiment: Employing Stationary Observation of Hologram Shadows Over Time.

In this related embodiment, a single (and fixed in the system of coordinates of the imaging system 100 of FIG. 1) source of object-illuminating light is used to capture a set of images of the same scene or object in a stationary fashion, during which no relative displacement between the object and the axis of the single light wavefront illuminating the object is introduced. In this stationary approach, in order to compensate the absence of spatial shifts that were required in the previously-disclosed embodiment to change information during the sequential acquisition of LR images of the object, advantage is taken of flickering of intensity of the beam of light L1 over time and filtering the multiple LR image data sets to reduce noise and increase spatial resolution. Notably, each of the multiple images of the scene or object is obtained as a result of illumination or irradiation of the object with a single, static diverging optical wavefront the axis of which is perpendicular to the plane of the single detector of the imaging system and the angle of divergence of which remains unchanged throughout the process of multiple image acquisition. In other words, the angle at which the object is illuminated with imaging light does not change between consecutively acquired LR images. This approach is advantageous in its simplicity, specifically in that the method of data acquisition is devoid of any movement of light source, sample, or optical detector.

According to this embodiment of the invention, multiple static observations (multiple hologram shadows) of the same object are acquired with the single detector of the system and then a multi-frame approach can be employed to increase the quality of holograms by noise-suppressing and summation of the image frames over time. Besides the absence of spatial physical shifts of the point-source to displace shadows, intensity variations can be verified during the acquisition step performed on consecutive frames. In this category of geometrical resolution improvement, intrinsic noise produced by the flickering intensities of light or even associated with electronic or physical aspects of the imaging device may fluctuate holographic signals.

To illustrate these variations, in FIG. 6A statically-acquired LR image frames is presented over time, where the variation of pixel intensities can be observed. Here, a patterning of 1 mm, divided into 100 lines (each one having a distance of 10 microns between every line pairs) was sequentially and statically imaged using the shadow imaging system 100 of FIG. 10 to form 50 images. Distinct individual frames are shown in blocks (b) and (c) of FIG. 6A, and also in blocks (d) and (e), respectively, for the same fraction of the image of block (a). A direct comparison between the frames of blocks (d) and (e) reveals fluctuations in pixel intensities for the same hologram shadow analyzed over time. Accordingly, sequentially and statically acquired shadow images of the same object possess distinct distribution of light intensities across such images.

Figure 6:
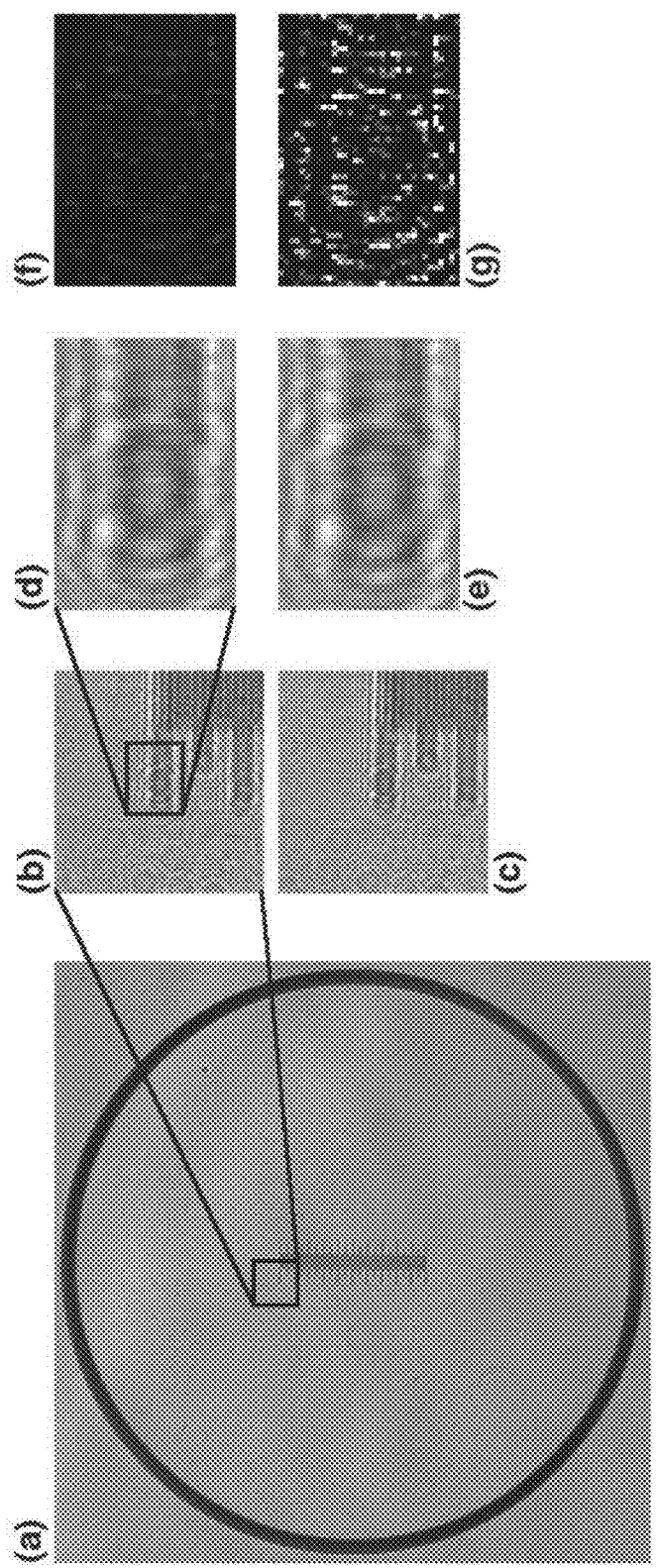
FIG. 6 illustrates static observation of image frames in time, in according with a related embodiment of the invention. A patterning of 1 mm sectioned into 100 markers is imaged using the proposed holographic platform in (a). Consecutive frames were obtained as shown in (b) and (c), and then, pixel intensities for a particular region on different frames were compared in (d) and (e), respectively. While images of (d) and (e) may appear to have the same content when perceived visually, the difference(s) between the image of (d) and the image of (e) are shown in (f) according to |d-e|. Additionally, the squared error determined form the image data of (d) and (e) as $|d-e|^2$ is illustrated in (g), which indicates that even stationary observation of consecutive frames, flickering variations can be captured over time.

A more detailed verification is obtained when a simple subtraction is performed between examples shown in FIG. 6 blocks (d) and (e), using for this purpose the absolute difference between these frames to form a frame shown in block (f). Additionally, the squared value of difference of intensities for each particular pixel (i.e., $|d-e|^2$) is also shown in block (g) to provide evidence that even in consecutive image frames, obtained under otherwise unchanged imaging conditions, the captured intensity distribution across the image varies. Such "flickering" of light intensity over time results in very spatial fluctuations of the diverging wavefront of the object-illuminating light beam L1 and, accordingly, spatial changes in the shadow of the imaged object on the order of fractions of a micron.

Based on the detected small pixel variations, the following procedure combining multi-frame and nonlinear filtering was adopted to reduce noise and increase the level of perceived details from the LR set:

(a) Each LR image is applied to a sharpness algorithm and it is up-sampled by a factor k using the Lanczos interpolation;

(b) Using the up-sampled image, anisotropic diffusion is applied to correct geometrical information of pixels of the up-sampled image. Due to its nature of mass transportation, boundaries are preserved and noise is selectively smoothed at the same time, conditioned to an iterative process.

(c) A multi-frame data fusion is performed to estimate a single HR image as a final step. This process is based on the summation of the up-sampled and processed images. Specifically:

(a) The Lanczos interpolation is based on the average of pixel intensities using sinc function. The use of Sinc functions is similar to sine interpolation, and its behavior is computationally similar to a cubic interpolation. On the other hand, cubic interpolation due its purpose tends to smooth the boundaries, losing some information of borders according to the kernel size. Lanczos interpolation, however, uses a kernel having a ringing shape designed to avoid blurring effects. The Lanczos sinc function can be defined as:

$$L(x)=\text{sinc}(x)\text{sinc}(x/a) \qquad (3),$$

if $-a<x<a$, and $L(x)=0$ otherwise. Parameter a is an integer positive determining the size of the kernel applied on the image.

When compared to the other methods, bilinear, bicubic or even based on Gaussian distribution are convolution operators with positive kernels, averaging neighboring pixels.

Lanczos interpolation is superior to many of other methods based on convolution since it is enabled to keep local contrast, or even enhancing. This is an important feature, especially when re-sampled image present detailed features such as gradient information. Lanczos interpolation tends to increase the capacity to detect borders and gradient peaks on the image. The Lanczos algorithm used in our approach is available on OpenCV computer vision library, and it is used in a C++ implementation of such multi-frame approach.

(b) The second step is the application of a nonlinear Anisotropic Diffusion Filter (ADF), an iterative algorithm designed for neighborhood pixels filtering in an effective manner, without losing gradient details. The filter works by performing smoothing on the image but at the same time preserving the boundaries between adjacent regions. The process is controlled by a diffusion matrix that measures the intensity variation on the neighborhood of a hot spot and by a contrast parameter (λ) that selectively defines where diffusion should be performed in this squared kernel. On the other hand, when the algorithm is applied over many iterations, the diffusion matrix slowly becomes adapted to the new local intensities, having a tendency to segment regions as well, finding a proper boundary between adjacent regions.

The anisotropic diffusion filter used in our approach has been proposed by Joachim Weickert, and it can be seen as a selective convolution technique, using an adaptive matrix-valued kernel that performs a special smoothing on images, inhibiting the smoothing on edge pixels and stimulating it on internal regions. The general diffusion equation for an image/(x, y) with M channels and a signal initialized with u(x, y, 0)=1(x, y) is $$\partial_t u_i = \mathrm{div}(D(\Sigma_{k=1}^M \nabla u_i \nabla u_k^T) \nabla u_i) \quad (4)$$

where D is a matrix-valued function or diffusion kernel, and 1=1, ..., M are the individual channels (1-dimensional in our case). Each component of kernel D can be computed by the follow diffusivity g equation given by:

$$g(x) = \exp(-(x^2/\lambda)) \quad (5)$$

where $x^2$ denotes variation in the region over the hot spot (usually the $L_2$-norm), and λ is a parameter which determines how strong the diffusion must be onto a region. Generally the kernel is an uneven matrix (3×3), and after the kernel is defined by a diffusivity function, the convolution is performed and then iteration is completed. Another relevant parameter of the algorithm is the number of iterations t, defining how many times this progressive effect of mass transportation around adjacent pixels should be performed. The implementation used in our approach was written in C++, being easily integrated in the holographic platform by an embedded system.

Figure 7:
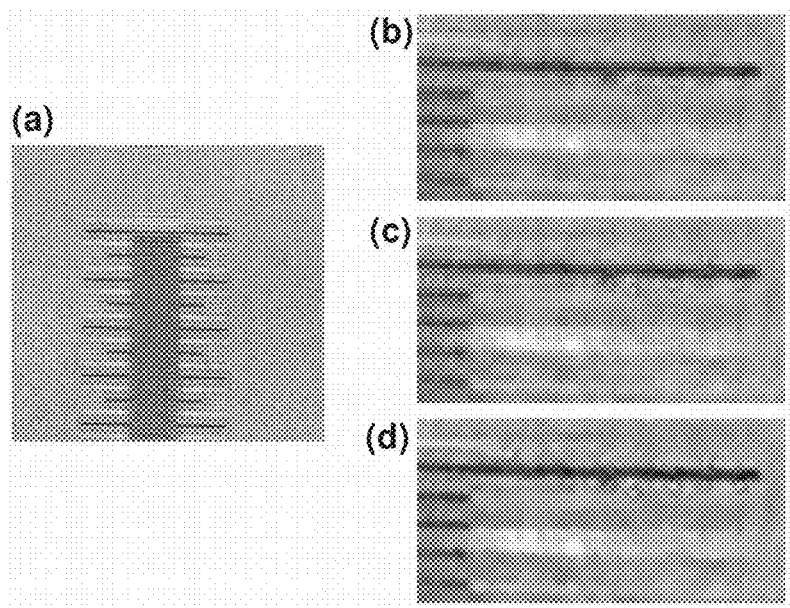
FIG. 7 presents the holographic shadow of FIG. 6 after numerical diffraction processing, in block (a). Individual hologram shadow frames are shown in blocks (b) in (c), respectively. The result of the computational pipeline for stationary multi-frame processing (static embodiment of the invention) based on stationary observation of frames is shown in (d) for f=3.

(c) The integration procedure includes a summation performed by the following equation:

$$I(x, y) = \frac{1}{m} \sum_{i=1}^{m} L_i \quad (6)$$

Where $L_i$ is a particular LR image, scaled by a factor k and post-processed with the diffusion procedure. The HR image I is a composition of the post-processed images obtained using a simple summation procedure. FIG. 6 presents the comparison of the resulting image produced according to the stationary observation methodology with static, single-shot individual image frames used to form the resulting hologram shadow. The same patterning used in FIG. 6 is shown in FIG. 7 block (a), and consecutive single-shot image frames are illustrated in blocks (b) and (c). A person of skill in the art would readily verify the difference in intensity distribution on a pixel-level between frames (b) and (c). The "stationary observation" result, obtained for a factor k=3, is presented in block (d), evidencing advantageous improvement of imaging quality as compared to single imaging frames. The observed increase in resolution was three-fold in number of pixels) The algorithm shows a tendency of pre-segmentation, provided by the ADF isolating the pattern lines on well-defined regions.

Additionally, there is no need of registration for sub-pixel processing since the approach simplifies the data-processing platform simpler as its implementation is based on lack of any movement in the imaging system hardware (for example, no need for a complex apparatus to shift the point-source as described in the related embodiment, thereby facilitating a miniaturization of the entire hardware platform.

FIG. 12 provides a comparison between the results of a single shot, multiple static observations according to the current embodiment and those following from the use of a dynamic embodiment discussed above and utilizing the shifts of the point light source formed by the pinhole 130 of the setup 100. FIGS. 12A, 12B images present maps of displacements of the point light source over plane, for static and dynamic embodiments, respectively. FIGS. 12C, 12D, and 12E illustrate a hologram shadow acquired with a single frame, the one formed with the use of a static embodiment, and the one formed with a dynamic embodiment, respectively.

In FIG. 14 (showing frames A1, A2, B1, B2) a visual comparison of the LR image (left side) and computationally resolved HR image (right side), both diffracted numerically, are presented. The hologram (shadow image) is formed by an object that is a resolution chart with lines spaced apart by 10 micrometers. Frames A1 and A2 illustrate portions of the LR image with difference magnification, while frames B1, B2 illustrate portions of the HR image with different magnification. For this experiment, an increment factor f=4 was used to compute a single HR image from a set of static observations of the scene. A direct visual comparison between the LR image (frames A1 A2) and the HR image (frames B1, B2) shows an increment of spatial resolution between line-pairs for the HR diffracted image. Initial resolution for the LR image is estimated to be 1.67 micrometers (6 pixels between each two line-pairs), which is affected by blurring having not clearly defined areas. For the HR part, the line pairs can be clearly perceived, 24 pixels between each line pair (~2 pixels correspond to <1 micrometer) can be observed, resulting in a resolution gain in the 2- to 3 orders of magnitude range obtained with an embodiment of the invention. Data representing changes in SNR as a result of image acquisition wand processing with the static embodiment of the invention were additionally procured.

In FIG. 15 the SNR assessment of a selection of 6 LR and HR images was performed, using a specific arbitrary frame as a reference r. The results illustrate a reduction of the SNR level (which initially varies from about 28 to 30 dB in the LR set), to 24 dB (for the HR image). The peak value of SNR in the LR set varies from about 35 to 39 dB, and for the HR image such peak was reduced to about 30 dB. Other measures such as RMSE and MAE are also presented, both presenting higher levels for HR image, since its signal is more homogeneous than in LR images. These last two measures tend to identify considerable deviations from a specified pattern.

A comparison of SNR values using the HR image as reference was also performed as shown in FIG. 16. Since the HR image was computed from the LR image set regularly, the obtained results indicate a substantially equal distribution of the SNR values. The results also suggest that there is no biased LR image, which one has contributed differently from the other LR image or weighed in the summation procedure.

FIG. 17 lists the equations used to compute SNR, PSNR, RMSE and MAE indexes for noise quality assessment.

High-Speed Frame-Rate Holographic Video Processing Embodiment.

This related embodiment implements a microscopy platform configured for 4D holographic video processing, where the same single, standard imaging sensor utilized in a dynamic and static embodiments discussed above is used to achieve very high frame-rate without the need of a dedicated specific high-speed imaging device.

The used CMOS imaging sensor 150 is able to capture frames in monochromatic mode, within a maximum spatial resolution of 3840×2748 pixels and frame-rate in the range of 2.6 to 3.2 frames per second (fps), considering the whole field of view (FOV) available for this imaging device (i.e.: about 30 mm$^2$). For practical applications, this kind of imaging sensor is limited to the visualization of static samples only, and no holographic video acquisition can be implemented for (very) fast motion of hologram shadows over time when considering the operational frame-rate aforementioned.

Figure 13:
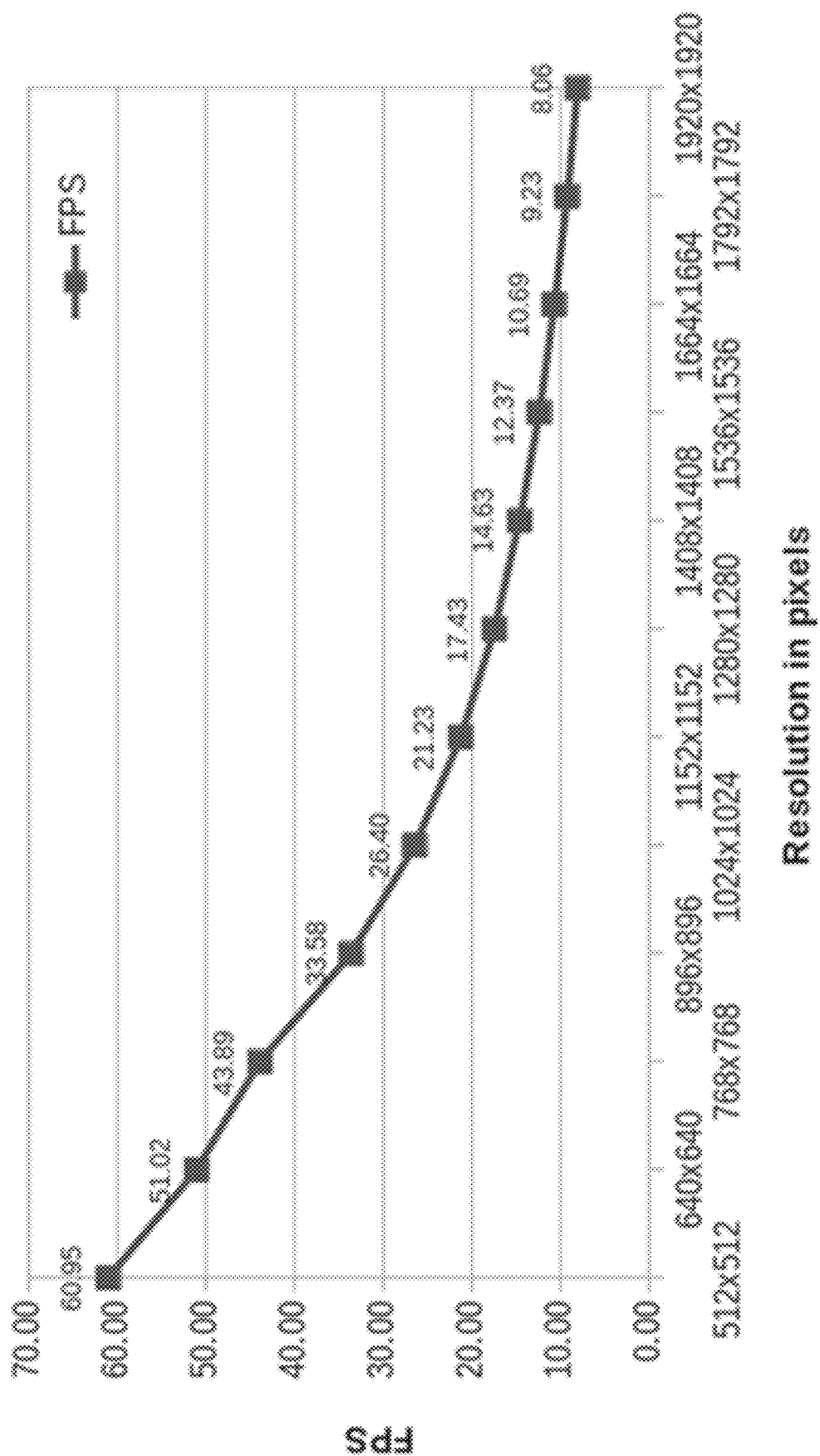
FIG. 13 is a plot illustrating the operational interplay between the frame-rate of optical data acquisition and a field-of-view defined by an optical shadow image being acquired.

On the other hand, sensor cells in a CMOS imaging device differ from those rooted in CCD technology, because of chip architecture each pixel has its own amplifier and conversion of photoelectrons is performed in parallel. Then, by reducing the active field-of-view (FOV of an image) during the acquisition, it is possible to increase the frame-rate to very high speeds using the same hardware set-up (as that used for the static acquisition configuration, for example) with some specific changes in its configuration and data-processing/computational pipeline. The latter can be effectuated directly with the use of an external program, written and compiled in binary code, using the SDK (Software Development Kit) provided by the manufacturer (in the case of the imaging sensor used in our approaches). Besides the significant reduction of active FOV available to capture holograms, frame-rate of the new embodiment is increased considerably, thus enabling capture sequential frames in a very high-frame rate. In conducted experiments, the redefinition of the FOV to be fitted around the microorganism body in motion (e.g.: 712×668 pixels) a rate of ~48 fps was achieved. Graph shown in FIG. 13 summarizes the empirical trade-off between the frame-rate (FPS) and image frame dimensions (Image FOV in pixels) after FOV redefinition. Generally, the image FOV can be configured or defined as a subset of a bigger image field without any pre-determined requirements, for example by setting initial x- and y-positions or a reference in the image field with respect to which corresponding width and height of the image FOV are then set. It is appreciated, therefore, that in one embodiment a shadow-based acquisition of optical data is implemented by (i) increasing a frame-rate of video acquisition of multiple LR images of an object while reducing a field of view subtended by each of the single LR images from the overall optical shadow cast by an object onto the detector and/or (ii) decreasing such frame-rate while increasing said first field-of-view. For example, and referring again to FIG. 13, while decreasing the area of the single captured image by about 4 times, the frame-rate of optical data acquisition has been increased more than 3-fold. In another example, while increasing the area of the single captured LR image by about 4 times, the frame-rate of optical data acquisition has been decreased by about 2.3 times.

For some microscopy applications, a frame-rate of approximately 30 fps is more than necessary to capture holograms and visualize microorganism's particularities in motion, thus opening a new range of applications for 4D holographic processing. The advantage of the proposed approach is in its ability to reconfigure the FOV for significant increase in the imaging-frame rate with the use of a conventional CMOS detector, thereby configuring the imaging system to be devoid of a specific high-frame rate industrial camera.

In practice, the following modifications were performed on the system of embodiment 100 to achieve a high-frame rate holographic video acquisition:

Creation of a specific user interface to redefine the new active FOV to capture holograms, as well as able to automatically re-dimension output images.

Reduction of exposure time during the image acquisition. When a pinhole 130 is used in a lensless platform 100, the light-source should be as close as possible to the pinhole, otherwise light is blocked and the amount of photons need to achieve sample and produce holograms is insufficient to produce images. To compensate for this geometrical limitation, the time during which the shutter is open is typically significantly increase to the highest possible level (in one case, up to about ~500 microseconds) to capture light, which additionally contributes (via large exposures) to blurring of the captured image. In the present embodiment, this problem has been solved. In particular, the light-source was replaced, as compared with source 120 discussed in reference to FIG. 1, with an inexpensive Arduino SMD red LED (from which the lens was removed), with additional reduction of intensity of the light-output. This red LED provides a small point-source by itself, and therefore the need in an additional pinhole 130 to achieve (partially) coherent light was alleviated and the embodiment was devoid of the pinhole 130 as compared with embodiment 100. As a consequence, the LED source was positioned only 3 cm away from the plane of the detector 150, thereby facilitating the reduction of the duration of the shutter being opened down to several microseconds (less than 10 microseconds, preferably less than 5 microseconds, which is a practically unexpected two-orders of magnitude lower level than that used in shadow imaging to-date) and leading to hologram acquisition with no blurring effect, at very high-frame rates.

The problem of elevated temperature of the object, which is often a concern for in-situ inspections, was addressed by increasing the distance between the detector and the plane (in practice, achieving the distance of 1 to about 1.2 mm, which generally corresponds to a thickness of a typical glass slide) at which the sample was positioned to avoid a direct contact between sample and sensor surface. In addition, a cooling system (such as a small GPGPU processor fan) was placed underneath the detector/platform to dissipate heating and/or avoid or reduce excessive evaporation.

Figure 8:
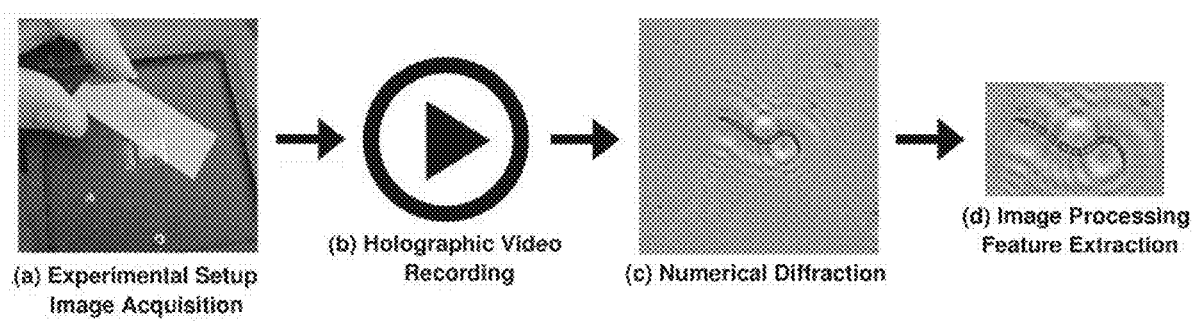
FIG. 8 provides a general overview of the holographic video platform for in-situ visualization of microorganisms. Image acquisition is performed using the experimental setup of block (a), and a high frame-rate holographic video is recorded as shown in block (b). Computational numerical diffraction processing is applied to decode each frame, block (c). Finally, image processing and feature extraction methods are additionally applied to interpret and track microorganism, block (d)

Confluence and density of particles is an intrinsic problem, well recognized in digital in-line holography. To address this problem, glass slides are only used with a drop of fluid to be inspected—as shown in FIG. 8 block (a).

Acquisition and computational processing were performed in sequence, in asynchronous mode (i.e, initially acquisition, then frame-by-frame processing). Numerical diffraction processing of data was performed just after the image acquisition is completed. The resulting holographic videos can be repeatedly analyzed using numerical diffraction to inspect specific object-planes (2D for plane+1D for time), or volumetric analysis (3D for volume+1D for time):

3D holographic visualization (2D for a plane image and an additional time dimension) was performed by selecting a specific frame in the holographic video, and then applying numerical diffraction processing to several object-planes to find the proper diffraction distance, used as a parameter of the numerical diffraction algorithm. Then, a specific plane (z-axis) was selected to process the whole video by applying the numerical diffraction processing frame-by-frame, with appropriate parameters, resulting in one output of diffraction for each frame. Following these steps, an integration procedure was used to re-compose individual resulting frames into a video of diffraction, where real, imaginary, amplitude and phase signals were available. In addition, a multi-dimensional colored video was also obtained from the recombination of real and imaginary parts into a multi-dimensional RGB image.

4D holographic visualization (3D for volume+1D for a time axis) is currently under development, and it combines the use of auto-focus methods to automatically determine the diffraction point for any arbitrary holographic shadow or sub-windows on the new FOV. Similarly to the previous visualization model, a holographic video is directly submitted to a numerical diffraction having as parameter initial and final object-planes, which means for each frame, several object-planes are obtained, composing a volume. In this volume of several planes, auto-focus methods help to determine distance from the detector-plane. This procedure is applied to every frame in the holographic video, but having as output a temporal volumetric reconstruction, where specimens can be visualized in x,y and z over time.

A general overview of the proposed holographic platform for high frame-rate video processing is presented in FIG. 8, blocks (a), (b), (c), and (d). Experimental setup is shown in block (a), where a drop of fluid contacting microorganisms is placed directly on a glass slide to record holographic video as shown in block (b). Using computational libraries specifically designed for video processing (such as FFMPEG), frames are extracted and then a numerical diffraction method, using a specific z-axis, is applied to reconstruct the signal as shown in block (c). Depending of the specimen to be analyzed, image processing and feature extraction methods can be used for a decision making procedure, as shown in block (d), where the nematode body analysis was implemented to automatically divide its body, track over time and extract relevant features.

Figures 9A, 9B, 9C:
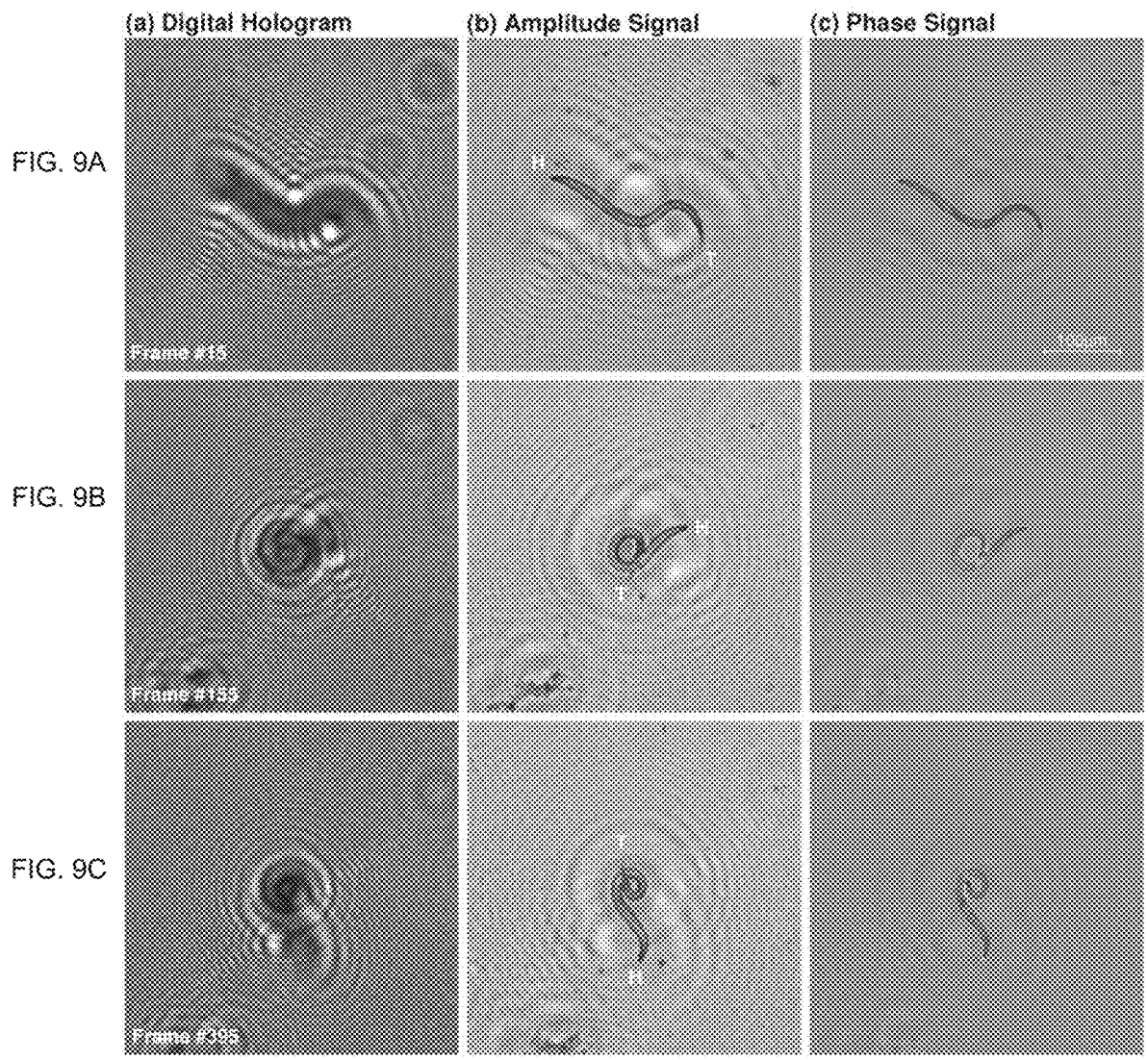
FIGS. 9A, 9B, and 9C illustrate the results of numerical diffraction processing of a holographic video of nematodes captured in a drop of water. Raw digital holograms are demonstrated in the first column (a). The data representing these raw signals are then processed according to numerical diffraction method with the use of an amplitude signal at pre designated z-axis, column (b). In Phase signal is demonstrated in column (c)

An example of the results obtained by the proposed holographic video platform is shown in FIGS. 9A, 9B, 9C, in blocks (a), (b) and (c)-. Some of distinct frames of the original holographic video are shown blocks (a), presenting complex holographic patterns as a function of time. After the numerical diffraction processing is applied, the amplitude signal reveals the movement of the micro-organism (as shown blocks (b)). The letters H and T indicate nematode head and tail, respectively. Additionally, phase signal was obtained from the angle between real and imaginary signals, as shown in blocks(c).

A computational interpretation is currently under development complement this holographic video platform. In the FIGS. 10A, 10B, 10C, the nematode is tracked over time, and relevant features are extracted to identify specific profiles. In FIG. 10A, nematode body and volume information are demonstrated. In FIGS. 10B, 10C, the nematode tracking over time is performed, indicating distinct motion for head and tail, respectively, as shown with curves 1010, 1020.

Figure 11:
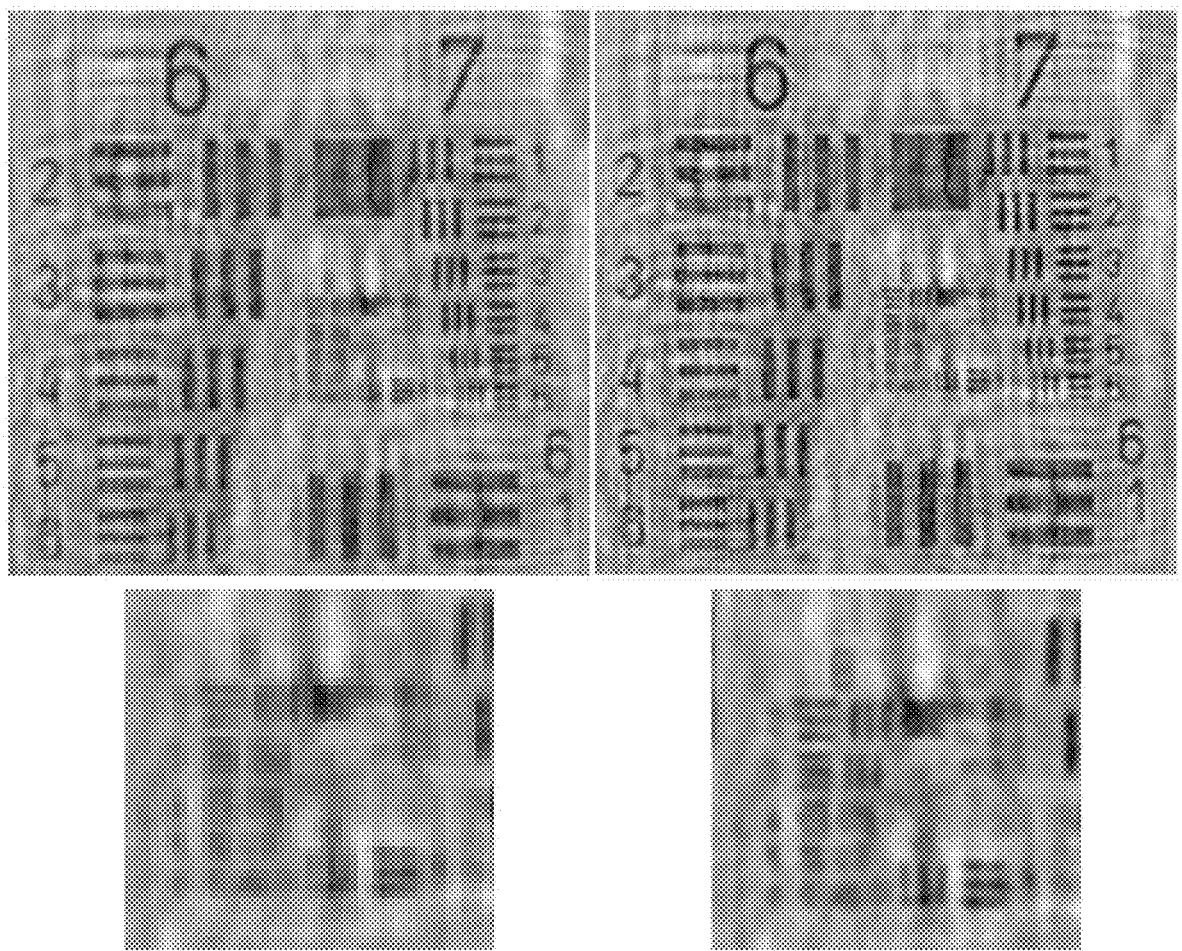
FIG. 11 denotes the result of the Total Variation (TV) Method for Super-resolution in a video, applied to USAF1951 resolution chart. In one implementation, the spatial resolution was increased from 2.71 microns to 1.55 microns.
Figure 12C:
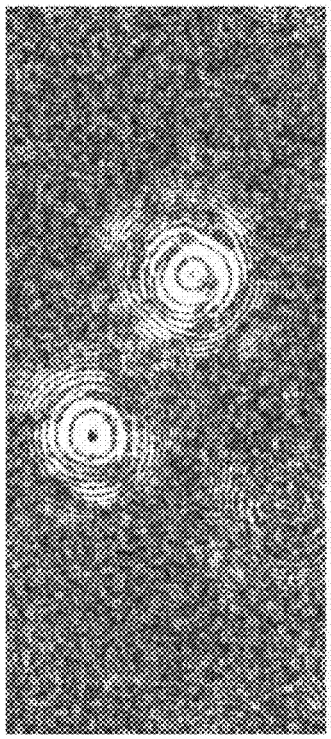
FIGS. 12A, 12B, 12C, 12D, and 12E illustrate the holographic shadow images formed directly from a single imaging frame, with the dynamic embodiment of the invention, and with a static embodiment of the invention.
Figure 12D:
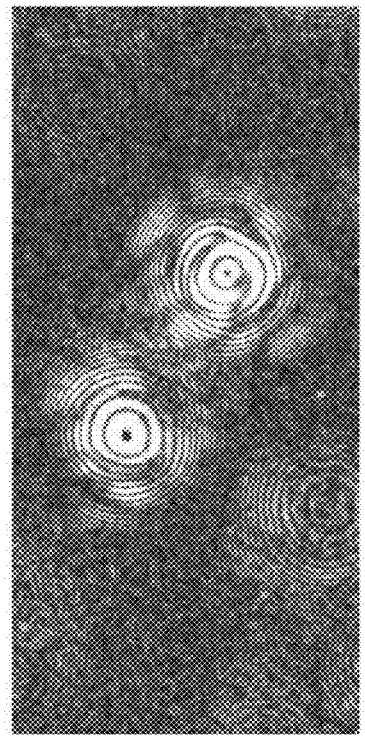
Figure 12E:
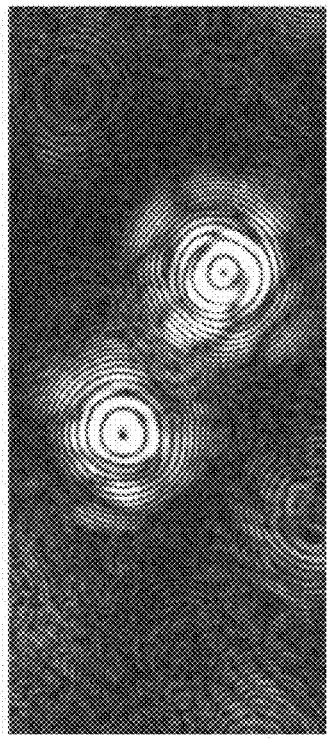
Figure 12A:
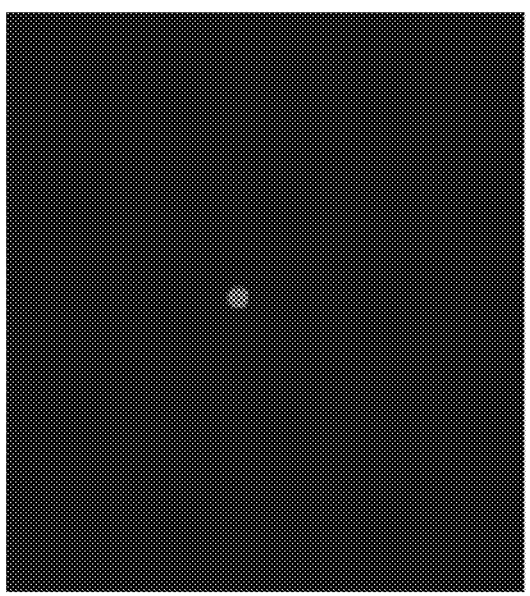
Figure 12B:
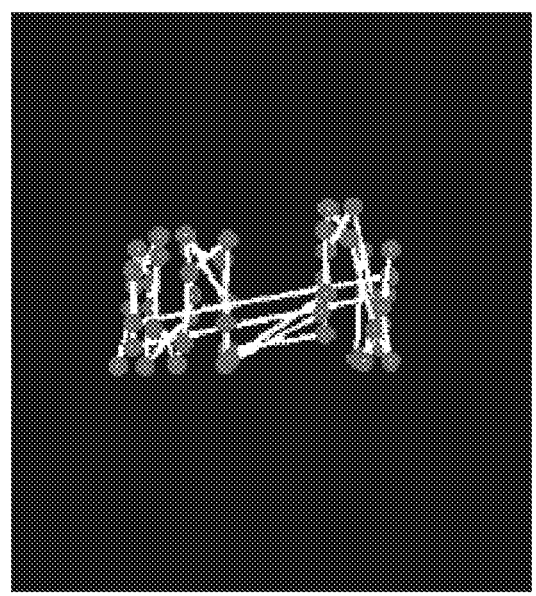

Holographic video for in-situ inspection is one of the possible applications of the proposed embodiment. Embedded image processing and pattern recognition methods, when combined, allow the development of specific applications for quantitative (counts) and qualitative analysis of specimens. As the holographic video can be reproduced repeatedly, 4D holography can be developed for volume X temporal analysis of samples. Experimentally, improvements in resolution were also observed for holographic video processing, such as that presented in FIG. 11, where a single frame (shown at the left side of FIG. 11) can be continuously analyzed over time to have its resolution increased (as show at the right side of FIG. 11). Here, elements of FIG. 11 show a resolution chart where pair-lines corresponding to Section 8-3 become visible in the higher-resolution counterpart portion of the Figure. Based on the same assumption where multiple frames can be combined to achieve a higher spatial resolution, holographic video has its resolution increased by using specific method for super-resolution in video. In FIG. 11, a super-resolution imaged based on the application of Total Variation (TVL1) and Optical Flow Algorithm [Mitzel, Pock, Schoenemann, Cremers., Video super resolution using duality based TV-L1 Optical Flow, DAGM, 2009; incorporated herein by reference] is presented.

Numerical Diffraction calculations used in implementation of embodiments of the invention can be performed, for example with the use of Angular Spectrum Method (ASM; see, for example, Shimobaba T. et al, Computational wave optics library for C++: CWO++ library 183(5), 2012; pp 1124-1138; incorporated herein by reference). The ASM represents a technique for modeling the propagation of a wave-field by expanding a complex wave-filed into a summation of infinite number of plane waves. Given spatial frequencies $f_X$ and $f_Y$, the wave-field can be expressed as $$u(m,n)=FFT^{-1}[FFT(u(m,n)H(m_1,n_1)]$$

Spatial frequencies, discretized in frequency domain according to x- and y-direction pitches of detector pixels, can be expressed as $(f_X, f_Y)=(m_1\Delta f_X, n_1\Delta f_Y)$, and $m_1$, $n_1$ are integer induces of the destination plane. The transfer function H is given by $$H((f_X,f_Y)=\exp(iz\sqrt{k^2-4\pi^2(f_X^2+f_Y^2)},$$

where λ is the wavelength of light produced by the light source while k is the wavenumber. The values denote the distance between the plane of the light source (represented by the aperture function) $u_1$ ($x_1$, $y_1$) and the destination plane (the plane of optical detector)$u_2$ ($x_2$, $y_2$), and is used as a parameter of the algorithm equivalent to the focal length at different height positions.

Embodiments of the invention haves been described as including a processor controlled by instructions or programs defining the functions performed by the embodiments and stored in a tangible, non-transitory memory storage and delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Some of the processes performed by the embodiments of the invention have been described with reference to flowcharts and/or block diagrams showing the steps that may be combined, separated into separate operation steps and/or performed in a different order.

While the invention is described through the above-described exemplary embodiments, it will be understood by those of ordinary skill in the art that modifications to, and variations of, the illustrated embodiments may be made without departing from the inventive concepts disclosed herein.

Disclosed aspects, or portions of these aspects, may be combined in ways not listed above. Accordingly, the invention should not be viewed as being limited to the disclosed embodiment(s).

The invention claimed is:

1. A shadow optical imaging method comprising:
  receiving, at a single detector of a lensless optical imaging system, an optical shadow cast thereon by an object disposed in immediate proximity to said single detector and irradiated with a single diverging monochromatic wavefront of light produced by a light source,
  wherein said wavefront of light has an axis;
  acquiring multiple sets of optical data with said single detector over a period of time, each set of optical data representing a respectively-corresponding first image of said optical shadow formed with said wavefront at a respectively-corresponding point in time within said period in absence of a relative movement of any of the light source, the object, and the single detector along the axis,
  wherein a first spatial position of at least one of said detector, said object, and said light source is different from a second spatial position of at least one of said detector, said object, and said light source, the first spatial position defined at a first point in time within said period, the second spatial position defined at a second point in time within said period;
  wherein said first image is characterized by first spatial resolution;
  from said multiple sets of optical data, forming a second image of said object with a computer processor by minimizing a cost-function that at least partially represents a degree of blurring of each first image,
  wherein said second image is characterized by second spatial resolution, the second spatial resolution being higher than the first spatial resolution.

2. A method according to claim 1, wherein said wavefront has a rate of spatial divergence that remains unchanged during said period.

3. A method according to claim 1, further comprising:
  introducing a relative spatial shift, between the object and said axis of the single diverging wavefront, in a plane parallel to the plane of said single detector, and wherein the acquiring multiple sets of optical data includes forming multiple images of said optical shadow each of which corresponds to a different value of said relative spatial shift.

4. A method according to claim 1, wherein said forming a second image of said object includes forming said second image with the computer processor by minimizing a function E, representing an error of sub-pixel spatial alignment, wherein $$E(I,L)=\alpha_i\Sigma_{i=1}^m(L_i-I)^2+\beta(\nabla I),$$

wherein L is a set of first images transformed by a set of decision continuous variables $\alpha_i$, I is irradiance of image pixel, and $\beta(\nabla I)$ is a measure of focus representing sharpness of a given first image.

5. A method according to claim 1, wherein the first image is characterized by the first signal to noise ratio (SNR), the second image is characterized by the second SNR, and the second SNR is higher than the first SNR.

6. A method according to claim 1, wherein said acquiring includes acquiring said multiple sets of optical data with said single detector over said period of time in absence of any relative movement of any of the light source, the object, and the single detector.

7. A shadow optical imaging method comprising:
  receiving, at a single detector of a lensless optical imaging system, an optical shadow cast thereon by an object that is disposed in immediate proximity to said single detector and that is irradiated with a single diverging monochromatic wavefront of light produced by a light source,
  wherein said wavefront of light has an axis;
  acquiring multiple sets of optical data with said single detector over a period of time, each set of optical data representing a respectively-corresponding first image of said optical shadow formed with said wavefront at a respectively-corresponding point in time within said period in absence of a relative movement of any of the light source, the object, and the single detector along the axis,
  wherein said wavefront has a rate of spatial divergence that remains unchanged in time and an optical axis the spatial orientation of which remains unchanged during said period of time,
  wherein said first image is characterized by a first spatial resolution;
  from said multiple sets of optical data, forming a second image of said object with a computer processor, said forming including anisotropic filtering of a set of optical data from said multiple sets to correct geometrical information of each first image.

8. A method according to claim 7, wherein spatial positions and orientations of said detector, said object, and said light source remain unchanged during said acquiring.

9. A method according to claim 7, wherein said receiving the optical shadow includes receiving said optical shadow cast onto said detector without cessation and interruption in time during said period.

10. A method according to claim 7, further comprising forming said diverging wavefront of light by spatially-filtering light that has been emitted by the only light source of said system at a pinhole.

* * * * *

UNITED STATES PATENT AND TRADEMARK OFFICE
CERTIFICATE OF CORRECTION

| | |
|---|---|
| PATENT NO. | : 10,769,765 B2 |
| APPLICATION NO. | : 16/409979 |
| DATED | : September 8, 2020 |
| INVENTOR(S) | : Antonio C. Sobieranski et al. |

It is certified that error appears in the above-identified patent and that said Letters Patent is hereby corrected as shown below:

In the Specification

Column 14, Line 47, "fmal" should be --final--.

Signed and Sealed this
Thirty-first Day of May, 2022

Katherine Kelly Vidal
*Director of the United States Patent and Trademark Office*